United States Patent [19]

Fritzsche

[11] Patent Number: 4,909,057
[45] Date of Patent: Mar. 20, 1990

[54] APPARATUS AND METHODS FOR CONTINUOUSLY FORMING EDGEWISE WOUND CORES

[75] Inventor: Harold L. Fritzsche, Fort Wayne, Ind.

[73] Assignee: General Electric Company, Fort Wayne, Ind.

[21] Appl. No.: 237,042

[22] Filed: Aug. 26, 1988

Related U.S. Application Data

[62] Division of Ser. No. 904,140, Sep. 4, 1986, Pat. No. 4,796,451, which is a division of Ser. No. 660,211, Oct. 12, 1984, Pat. No. 4,613,780.

[51] Int. Cl.⁴ .................. B21D 11/06; H02K 15/00
[52] U.S. Cl. ........................ 72/131; 29/605; 29/736; 72/142
[58] Field of Search ............... 29/605, 609, 738, 736; 72/130, 131, 132, 134, 135, 142, 371, 143

[56] References Cited

U.S. PATENT DOCUMENTS

| | | | |
|---|---|---|---|
| 1,623,766 | 4/1927 | Way | 72/142 X |
| 1,920,155 | 7/1933 | Fisher | 72/142 X |
| 1,920,354 | 8/1933 | Carpenter | 171/252 |
| 3,062,267 | 11/1962 | Hart et al. | 72/142 |
| 3,095,774 | 7/1963 | Hart | 83/37 |
| 3,243,623 | 3/1966 | Hart | 310/216 |
| 3,283,399 | 11/1966 | Hart et al. | 29/605 |
| 3,393,547 | 7/1968 | Kortan | 72/131 |
| 3,577,851 | 5/1971 | Detheridge | 310/216 |
| 3,708,706 | 1/1973 | Akiyama et al. | 310/216 |
| 3,886,256 | 5/1975 | Ohuchi | 310/216 |
| 4,102,040 | 7/1978 | Rich | 29/605 X |
| 4,116,033 | 9/1978 | Iwaki et al. | 72/142 |
| 4,193,281 | 3/1980 | Kulikov et al. | 72/130 |
| 4,206,624 | 6/1980 | Asai et al. | 72/131 |
| 4,423,343 | 12/1983 | Field, II | 310/216 |
| 4,464,916 | 8/1984 | Grew et al. | 72/17 |

FOREIGN PATENT DOCUMENTS 0139329 12/1979 Fed. Rep. of Germany ...... 310/216

Primary Examiner—E. Michael Combs
Attorney, Agent, or Firm—Ralph E. Krisher, Jr.

[57] ABSTRACT

A method of continuouly forming edgewise wound cores from a continuous lanced strip of a ferromagnetic material having a pair of opposite faces interposed between a pair of opposite edges at least in part extending lengthwise of the lanced strip. In practicing this method, the lanced strip is continuously drawn through a bending zone in which at least the opposite edges are constrained, and the lanced strip is continuously deformed generally edgewise thereof about an axis of the bending zone so as to continuously from a plurality of helical convolutions. At least as the lanced strip travels beyond the bending zone, the lanced strip is pressed against a rotatable surface to effect the continuous drawing of the lanced strip through the bending zone.

A core, a lanced strip, and apparatus are also disclosed.

56 Claims, 23 Drawing Sheets

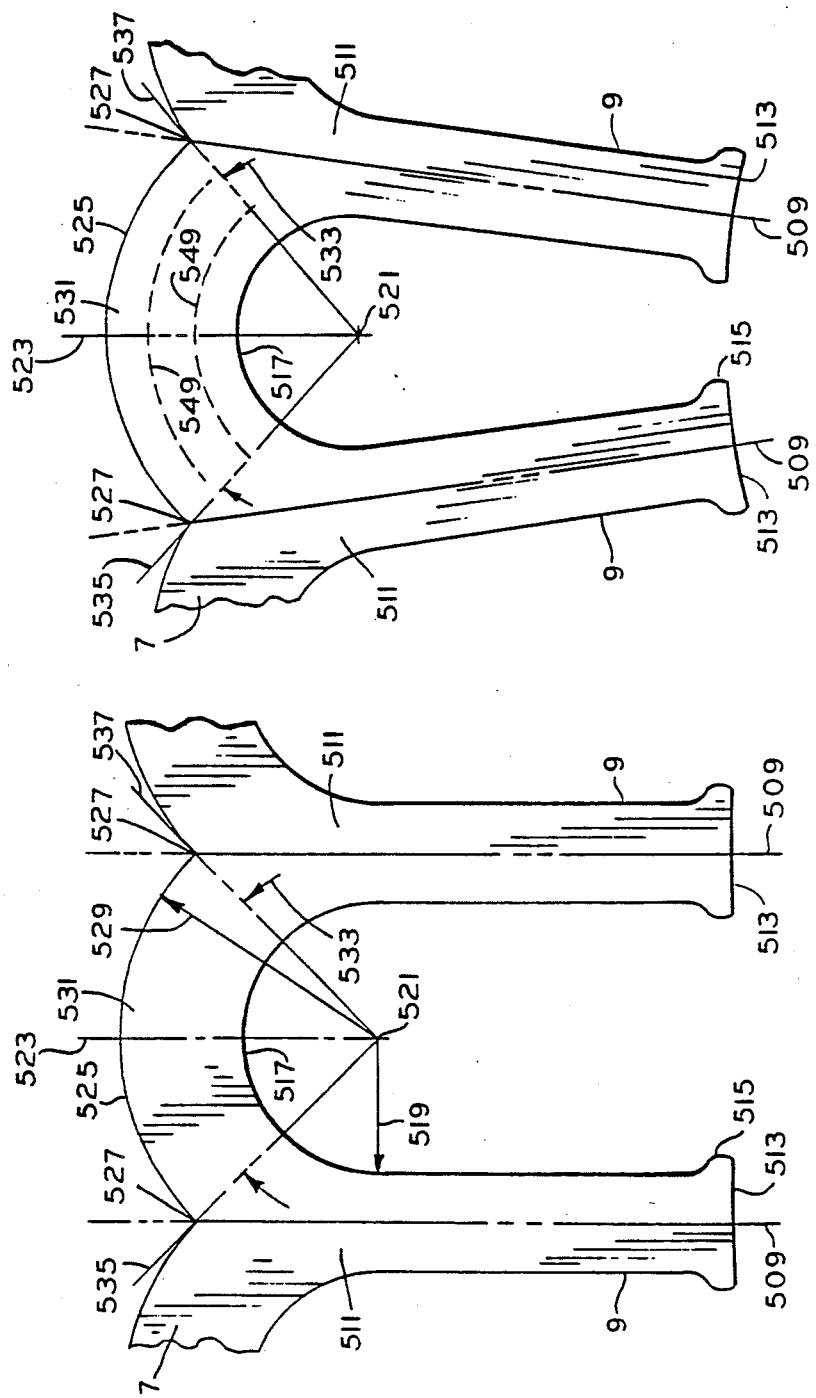

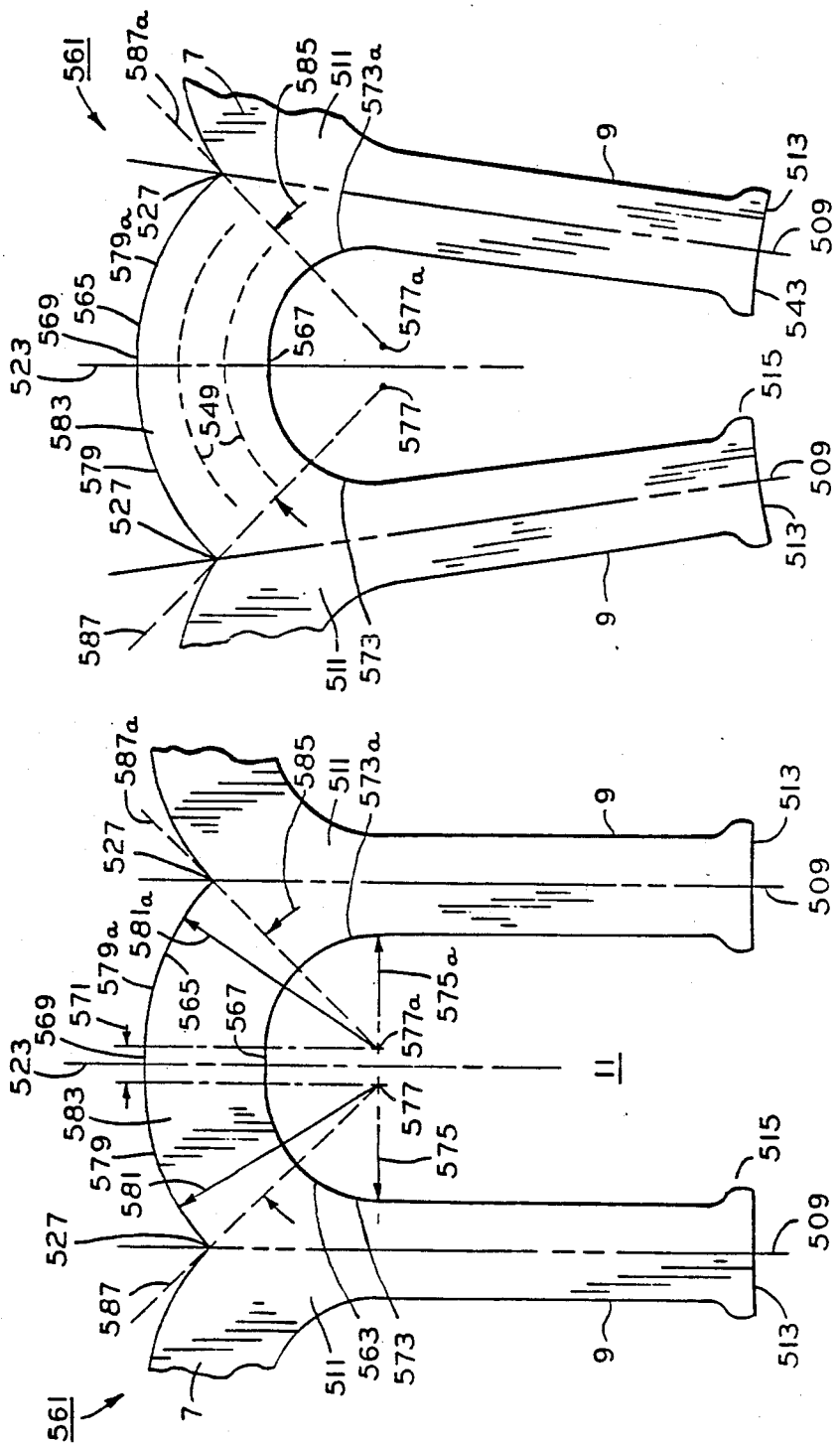

APPARATUS AND METHODS FOR CONTINUOUSLY FORMING EDGEWISE WOUND CORES

CROSS-REFERENCE TO RELATED APPLICATIONS

This is a division of copending parent application Ser. No. 904,140 filed Sept. 4, 1986 U.S. Pat. No. 4,796,451 which in turn is a division of grandparent application Ser. No. 660,211 filed Oct. 12, 1984 (now U.S. Pat. No. 4,613,780 issued Sept. 23, 1986), and such parent and grandparent applications are each incorporated by reference herein. This application is related to the following listed, commonly assigned, applications filed concurrently with the aforementioned grandparent application Ser. No. 660,211, and each of such related applications is also incorporated by reference herein, respectively:

(1) Application Ser. No. (660,101) of James L. King entitled "Lanced Strip, Dynamoelectric Machine, Core, Method Of Forming Such Core, Stationary Assembly, And Method Of Assembling Such Stationary Assembly"(now U.S. Pat. No. 4,712,292 issued Dec. 15, 1987); and (2) Application Ser. No. (660,116) of Gustave F. Wiedemann entitled "Apparatus And Methods For Forming Edgewise Wound Cores"(now U.S. Pat. No. 4,643,012 issued Feb. 17, 1987).

FIELD OF THE INVENTION

This invention relates in general to dynamoelectric machines and in particular to apparatus and methods for forming edgewise wound cores adapted for use in such dynamoelectric machines.

BACKGROUND OF THE INVENTION

In the past, various and sundry apparatus and methods have been utilized for forming edgewise wound cores adapted for use in dynamoelectric machines. For instance, in some of the past apparatus and methods for forming edgewise wound cores, means, such as a punch press or multiple die or the like for instance, was intermittently operable to lance a continuous strip of generally thin ferromagnetic material into the desired configuration therefor, and such lanced continuous strip was intermittently fed from the lancing means to a means, such as a winding device or the like, which was also intermittently operable for deforming the lanced continuous strip generally edgewise thereof into a plurality of generally helical convolutions so as to effect the formation of an edgewise wound core. In at least some of the above discussed apparatus, the winding device was idle when the punch press was intermittently operable to lance the continuous strip, and alternatively, the punch press was idle when the winding device was intermittently operable to effect the generally edgewise deformation of the continuous strip fed thereto. While the above discussed past apparatus for forming edgewise wound cores undoubtedly exhibited many salient features, it is believed that at least one of the disadvantageous or undesirable features thereof was that the alternative operation or idleness of the punch press and winding device of such past apparatus resulted in an unnecessarily limited production capacity for such past apparatus.

Further, during the intermittent operation of some of the deforming devices utilized in the above discussed past apparatus, a pair of gripping elements of such past deforming devices gripped a pair of opposite faces of the lanced continuous strip between a pair opposite edges of such strip, and such gripping elements were thereafter conjointly oscillated through a preselected arc thereby to pull a section of the continuous strip through a cooperating deforming die or the like and effect the edgewise deformation of such strip section, i.e. deformation generally radially in the direction of the opposite edges thereof. Subsequent to each oscillation of the gripping elements through the preselected arc thereof, the gripping elements were operated to release the gripping engagement thereof with the opposite faces of the continuous strip, and thereafter the gripping elements are conjointly reversely oscillated through their preselected arc to their original positions where they were grippingly reengaged with the opposite faces of the continuous strip. Of course, the above discussed oscillations of the gripping elements through their preselected arc resulted in an intermittent pulling of sections of the continuous strip through the deforming die to effect the aforementioned deformed helical convolutions from which the edgewise wound cores were formed, and such oscillations of the gripping elements are believed to have occurred when the punch press was idle, as previously mentioned. While the above discussed past deforming device operable to intermittently pull the continuous strip through a deforming die therefor undoubtedly disclosed many salient features, it is believe that at least one of the disadvantageous or undesirable features thereof was that the intermittent deformation of only sections of the continuous strip upon the oscillatory rotation of the gripping elements resulted in an unnecessarily limited production capacity for such past deforming device.

In other past apparatus, a plurality of pins in a rotary element were protractively movable therefrom into driving engagement between a plurality of teeth lanced into the continuous strip so as to drive or push the continuous strip through a deforming die to effect the aforementioned deformed helical convolutions from which the edgewise wound cores were formed. In this instance, the opposite edges of the strip were engaged between the deforming die and a part of the rotary element during the deformation of the continuous strip into the helical convolutions thereof. Of course, upon the deformation of the continuous strip into the helical convolutions thereof, the pins in the rotary element were retractively movable therein toward a position disengaged from the continuous strip. While this type of past apparatus utilizing the rotary element with reciprocally movable pins to engage and drive the strip through the deforming die undoubtedly had many salient features, it is believed that at least one of the disadvantageous or undesirable features thereof was that only one type of core could be manufactured thereon since it is believed that the reciprocating pins were not adjustable with respect to wear or to accommodate continuous strips having teeth lanced therein of different pitch or having different sized yoke sections. It is also believed that another disadvantageous feature or undesirable feature of such past apparatus utilizing reciprocally movable pins was that there was no adjustability therein to compensate for the various different amount of spring back encountered with respect to the use of different ferromagnetic material in the continuous strips being edgewise wound into cores.

In the formation of such past edgewise wound cores, the aforementioned lanced strip of generally thin ferromagnetic material was edgewise wound or deformed into a plurality of generally helical convolutions thereof, and such helical convolutions were accumulated into a generally annular stack thereof having a generally preselected stack height or length. Some of the aforementioned past lanced strips were laterally defined by a pair of generally parallel opposite edges, and a plurality of spaced apart teeth were formed on the strip generally lengthwise thereof with a tip of each tooth being defined by one of the opposite edges of the lanced strip, i.e., the tooth tip edge. The other of the opposite edges of the lanced strip defined a part of a yoke section which extended generally lengthwise thereof and from which the teeth extended generally laterally, and a plurality of winding receiving slots were provided in the strip between adjacent ones of the teeth and the yoke section, respectively. Each of the slots had a closed end at the yoke section extending generally parallel with the aforementioned other opposite edge or yoke section edge of the lanced strip and between adjacent ones of the teeth thereby to define a flat bottom slot, and an open end of each slot intersected the one opposite edge of the lanced strip between adjacent ones of the tooth tips.

When the aforementioned flat bottom slots were provided in the lanced strip, a plurality of segments were provided in the yoke section of the lanced strip extending generally between the one opposite edge thereof and the closed ends of the slots and such segments had a generally uniform cross-sectional area, respectively. The generally uniform cross-sectional areas of the segments in the yoke section of the lanced strip were, of course, effective to enhance the aformentioned edgewise and helical deformation of the lanced strip when it was edgewise and helically wound into the helical convolutions thereof during the formation of the edgewise wound cores since such edgewise winding required small unit deformations in the segments of the yoke section which was achieved by bending and stretching, i.e. stressing, the segments of the yoke section over the uniform cross-sectional areas thereof, respectively. When the helical convolutions of the edgewise wound lanced strip were accumulated into the generally annular stack thereof to define a respective one of the edgewise wound cores, as previously mentioned, the teeth on the lanced strip were arranged generally in axial row formation between a pair of opposite end faces of the core with the tips of the teeth defining in part a bore intersecting with the opposite end faces, and the flat bottom slots in the strip were also arranged generally in axial row formation so as to intersect with the opposite end faces of the core, respectively.

While the past edgewise wound cores having flat bottom slots therein, as discussed above, undoubtedly exhibited many salient features, at least one of the disadvantageous or undesirable features thereof is believed to be that it was difficult to position or place coils of windings into such flat bottom slots and achieve a desired slot fill of such coils. For instance, a pair of opposed corner sections were formed in the flat bottom slots generally at the juncture of adjacent pairs of the teeth with the closed ends of the flat bottom slots interposed therebetween. When the round insulated magnet wire of the winding coils was placed into the flat bottom slots, it is believed that such round wire of the winding coils had a tendency to move away from the corner sections of the flat bottom slots generally toward the center thereof. In other words, it is believed that the round wire of the winding coils would not fill the corner sections of the flat bottom slots thereby to establish voids therein which, of course, obviated achieving the desired or designed fill of the flat bottom slot with the winding coils. In order to achieve the desired or designed fill of the flat bottom slots with the round wire of the winding coils, it is believed that an additional manufacturing step was necessary, i.e., a winding press back operation, to move the round wire of the winding coils into the opposed corner sections of the flat bottom slots. Of course, this additional press back operation on the winding coils is also believed to be a disadvantageous or undesirable feature since it required additional expense for additional equipment and labor to effect such press back operation.

In other past lanced strips utilized in the formation of edgewise wound cores, one of the opposite edges of the lanced strip bounded the yoke section thereof, and the teeth on the lanced strip extended generally laterally from the yoke section thereof with the tips of the teeth terminating at the other of the opposite edgewise of the strip. The slots in the lanced strip between adjacent ones of the teeth thereof had an open end which intersected the other opposite edge of the strip between adjacent ones of the tooth tip, and a closed end of the slots provided at the yoke section between adjacent ones of the teeth had a generally arcuate or rounded configuration thereby to define a round bottom slot, respectively. When these round bottom slots were provided in the lanced strip, a plurality of segments were provided in the yoke section on the lanced strip generally between the one opposite edge or yoke section edge thereof and the closed ends of the round bottom slots and the cross-sectional areas of such segments were nonuniform. Therefore, when the lanced strip was edgewise deformed as it was edgewise wound into the helical convolutions thereof to form an edgewise wound core, as previously discussed, one of the disadvantageous or undesirable features is believed to be that greater forces were required to effect the edgewise deformation of the lanced strip due to the nonuniformity of the cross-sectional areas of the segments in the yoke section of the lanced strip. In other words, the unit deformations in the segments of the yoke section achieved by bending and stretching, i.e. stressing, such segments would be greater over the nonuniform cross-sectional areas thereof than would be if such cross-sectional areas were uniform. An analogous disadvantageous or undesirable feature is believed to be that greater stresses are imparted to the nonuniform cross-sectional areas of the segments in the yoke section of the lanced strip which are proportional to the aforementioned greater forces believed to be necessary to effect the deformation of the lanced strip having round bottom slots therein, as mentioned hereinabove. Thus, the more stress imparted to the lanced strip during the edgewise deformation thereof, the greater the spring-back of the lanced strip is believed to be subsequent to its edgewise deformation which is believed to result in less control over the tolerances or positions of the component parts of the strip with respect to each other when the accumulated helical convolutions of the lanced strip attain the preselected axial stack height thereof to form the edgewise wound core.

SUMMARY OF THE INVENTION

Among the several objects of the present invention may be noted the provision of an improved methods for forming edgewise wound cores and improved apparatus which overcome, at least in part, the disadvantageous or undesirable features discussed above, as well as others, with respect to the prior art; the provision of such improved apparatus and methods in which a continuous strip of a ferromagnetic material having a pair of opposite faces interposed between a pair of opposite edges extending at least in part lengthwise of the strip is continuously wound or deformed generally edgewise thereof into a plurality of generally helical convolutions thereby to effect the formation of the edgewise wound cores; the provision of such improved apparatus and methods in which the continuous lanced strip is continuously drawn or pulled through a work station at which the continuous lanced strip is continuously deformed; the provision of such improved apparatus and methods in which one of the opposite faces of the lanced strip is pressed against a rotatable surface to effect the continuous drawing of the lanced strip through a deforming means or bending zone; the provision of such improved apparatus and methods wherein a mandrel is rotated on a preselected axis of a curved deformation or bending surface in the bending zone with the rotatable surface being on the mandrel; the provision of such improved apparatus and methods wherein the opposite edges of the lanced strip are constrained between the curved bending surface and the mandrel to effect the edgewise deformation of the lanced strip into the helical convolution thereof; the provision of such improved apparatus and methods wherein another rotatable surface arranged at least in part opposite the aforementioned rotatable surface is engaged with the other of the opposite faces in the lanced strip so as to at least assist in the continuous drawing of the lanced strip through the bending zone; the provision of such improved apparatus and methods in which the helical convolution of the edgewise wound lanced strip are accumulated in a generally axial stack with a respective one of the helical convolutions being severed at least generally as the axial stack attains a preselected stack height; and the provision of such improved apparatus and methods in which a respective one axial stack height having attained the preselected height is removed subsequent to the severance of the aforementioned respective one of the helical convolutions without interrupting the continued accumulation of successive ones of the helical convolutions in at least another successive axial stack. These as well as other objects and advantageous features of the present invention will be in part apparent and in part pointed out hereinafter.

In general, apparatus is provided in one form of the invention for continuously forming edgewise wound cores from at least one continuous strip of ferromagnetic material having a pair of opposite faces interposed between a pair of opposite edges at least in part lengthwise of the strip. In this apparatus, a pair of rotatable means arranged in gripping engagement with the opposite faces of the at least one continuous strip are operable generally conjointly for continuously drawing the strip through at least a part of the apparatus, and means associated with one of the rotatable means so as to contain at least the opposite edges of the at least one continuous strip is operable generally for continuously deforming the at least one continuous strip generally edgewise thereof into a plurality of generally helical convolutions in response to the conjoint operation of the rotatable means.

Further in general, a method is provided in one form of the invention for continuously forming edgewise wound cores from a continuous strip of generally thin ferromagnetic material having a pair of opposite faces interposed between a pair of opposite edges at least in part extending lengthwise of the continuous strip. In the practice of this method, the continuous strip is continuously drawn through a bending zone in which at least the opposite edges of the continuous strip are constrained, and thereby the continuous strip is continuously bent about an axis of the bending zone so as to continuously form a plurality of generally helical convolutions. A rotatable surface is rotated about the axis of the bending zone, and one of the opposite faces of the continuous strip at least as it travels beyond the bending zone is pressed against the rotatable surface to effect the continuous drawing of the continuous strip through the bending zone.

BRIEF DESCRIPTION OF THE DRAWINGS

FIG. 1A is a schematic diagram showing a winder speed control of the apparatus and a circuit therefor including certain sensors also shown in FIG. 1;

FIG. 26 is an enlarged fragmentary view of the lanced strip illustrated in FIG. 24 prior to the formation thereof into the core;

FIG. 27 is an enlarged fragmentary view of the lanced strip illustrated in FIG. 24 subsequent to the formation thereof onto the core;

FIG. 30 is a fragmentary view of an alternative lanced strip prior to the formation thereof into the core; and FIG. 31 is a fragmentary view of the alternative lanced strip of FIG. 30 subsequent to the formation thereof in the core.

Corresponding reference characters indicate corresponding parts throughout several views of the drawings.

The exemplifications set out herein illustrate the preferred embodiments of the invention in one form thereof, and such exemplifications are not to be construed as limiting either scope of the invention or the scope of the disclosure thereof in any manner.

DESCRIPTION OF THE PREFERRED EMBODIMENTS

Figure 1:
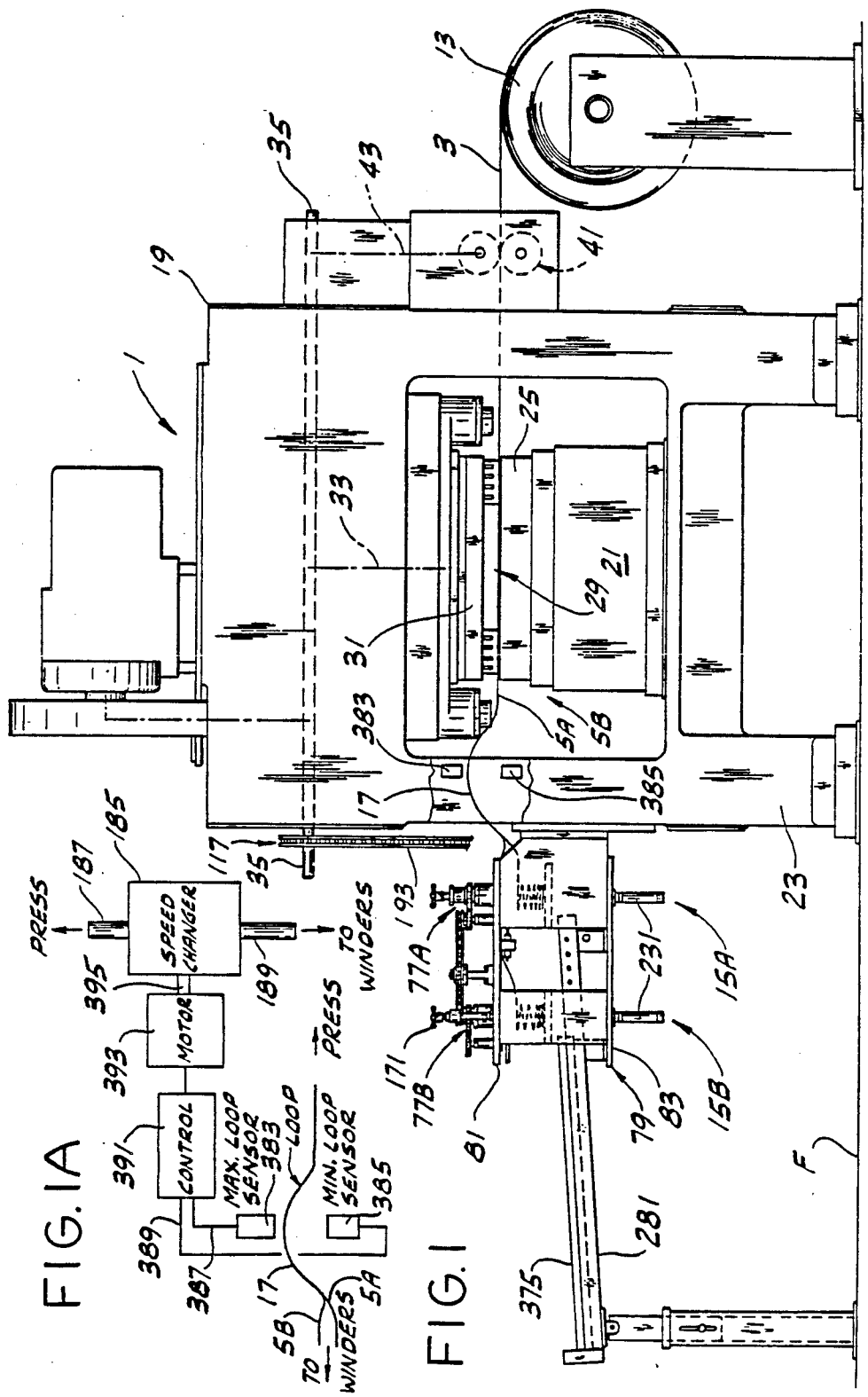
FIG. 1 is a side elevational view showing apparatus for continuously forming edgewise wound cores in one form of the invention and illustrating principles which may be practiced in methods for continuously forming edgewise wound cores also in one form of the invention.
Figure 18:
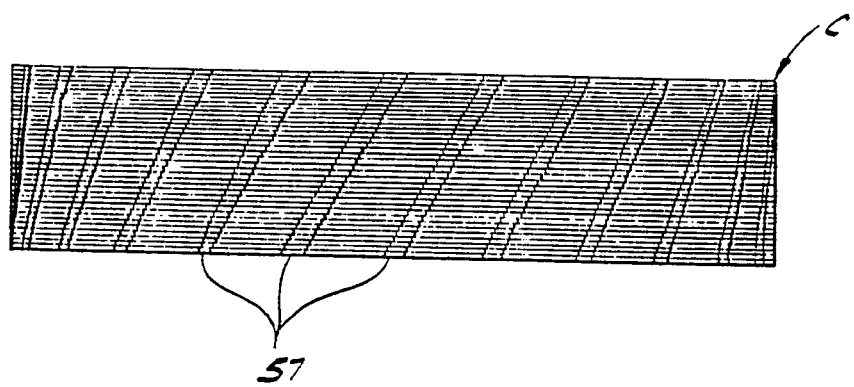
FIG. 18 is a side elevational view of the edgewise wound core of FIG. 17.
Figure 19:
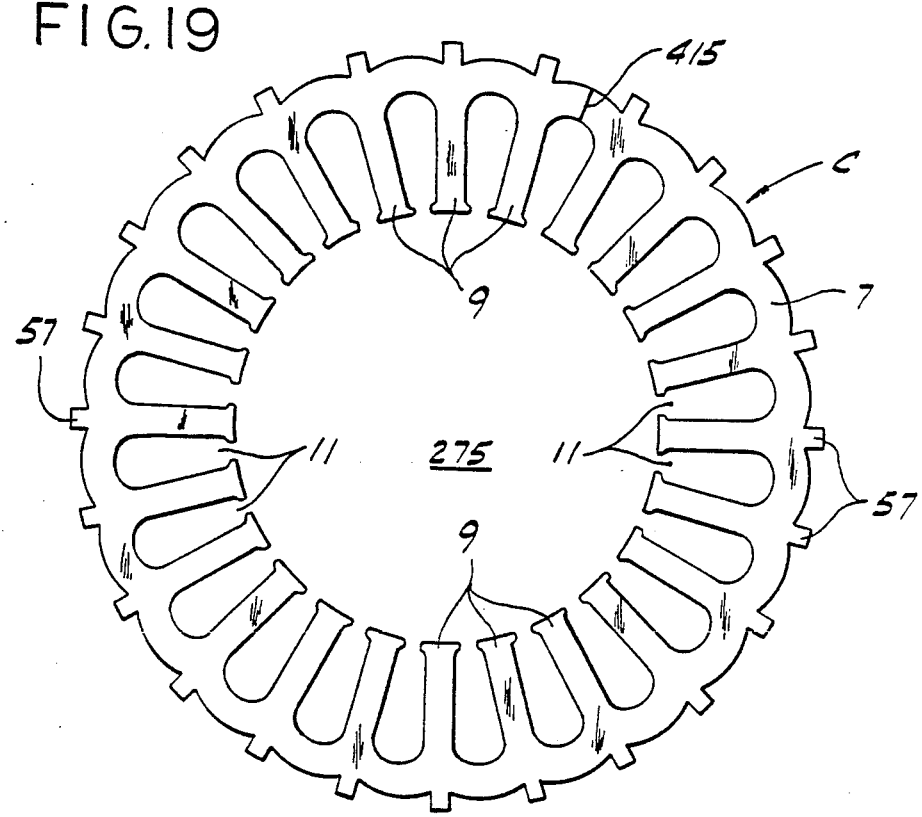
FIG. 19 is a plan view similar to FIG. 17 but showing the edgewise wound core after an operation to align the teeth and slots of the helical convolutions thereof.
Figure 20:
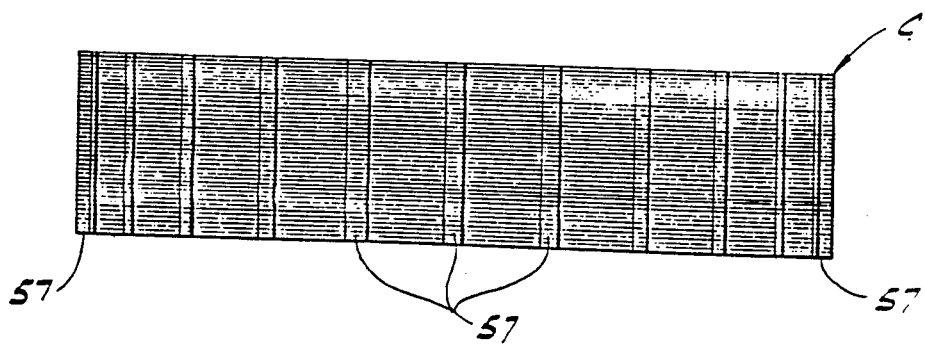
FIG. 20 is a side elevational view of the edgewise wound core of FIG. 19.

Referring to the drawings and in particular to FIG. 1, there is shown in one form of the invention apparatus having an operation or work station indicated generally at 1 at which a metal strip stock 3 is operated upon to divide or lance it into a plurality of individual strips having preselected configurations, each for being edgewise wound into helices defining edgewise wound cores. In particular, strip stock 3 is a generally thin strip of ferromagnetic material suitable for making cores for dynamoelectric machines, such as for instance stator or rotor cores for electric motors. As herein illustrated, strip stock 3 is divided or lanced into a plurality of continuous strips or lanced strips, such as a pair thereof as designated 5A, 5B (see FIGS. 2, 5 and 6). These continuous strips are identical, each comprising what may be termed a continuous band, such as a yoke or yoke section 7, extending longitudinally or lengthwise with respect to the strip and a series of teeth 9 extending generally laterally outwardly from the band at one side thereof with a series of slots 11 between adjacent ones of the teeth. Teeth 9 of each strip comprise material taken from the regions of slots 11 of the adjacent strip for reduction of waste of the ferromagnetic material, and the teeth extend into the slots of the adjacent strip. As herein illustrated, each strip is edgewise wound into a stator core C (see FIGS. 4, 7, 9 and 17-20) for an electric motor with band 7 of the strip forming the yoke or yoke section of the core and teeth 9 extending radially inwardly from the yoke. In the core, in its completed state as illustrated in FIGS. 19 and 20, teeth 9 of adjacent helical convolutions of the strip are aligned, as are slots 11, so that the core has coil slots at 11 for receiving windings (not shown). If a more detailed discussion is desired with respect to the configuration of lanced strips 5A, 5B and/or a core edgewise wound therefrom, reference may be had to the aforementioned application Serial No. 660,101.

At 13 in FIG. 1 is indicated a supply (a coil) of strip stock 3 which is intermittently fed in increments from this supply to operating station 1 of the apparatus with a dwell between successive feed cycles. At operation station 1, strip stock 3 is operated upon to divide it into continuous strips 5A, 5B which are intermittently fed from the operation station concomitantly with the feed of the strip stock thereto, and the continuous strips are separated one from the other thereafter passing to a plurality of other respective operation or work stations, such as for instance a pair of winding stations indicated generally at 15A, 15B. Each of strips 5A, 5B is continuously wound generally edgewise thereof into a helix at the respective winding station, as will be discussed in detail hereinafter.

Figure 4:
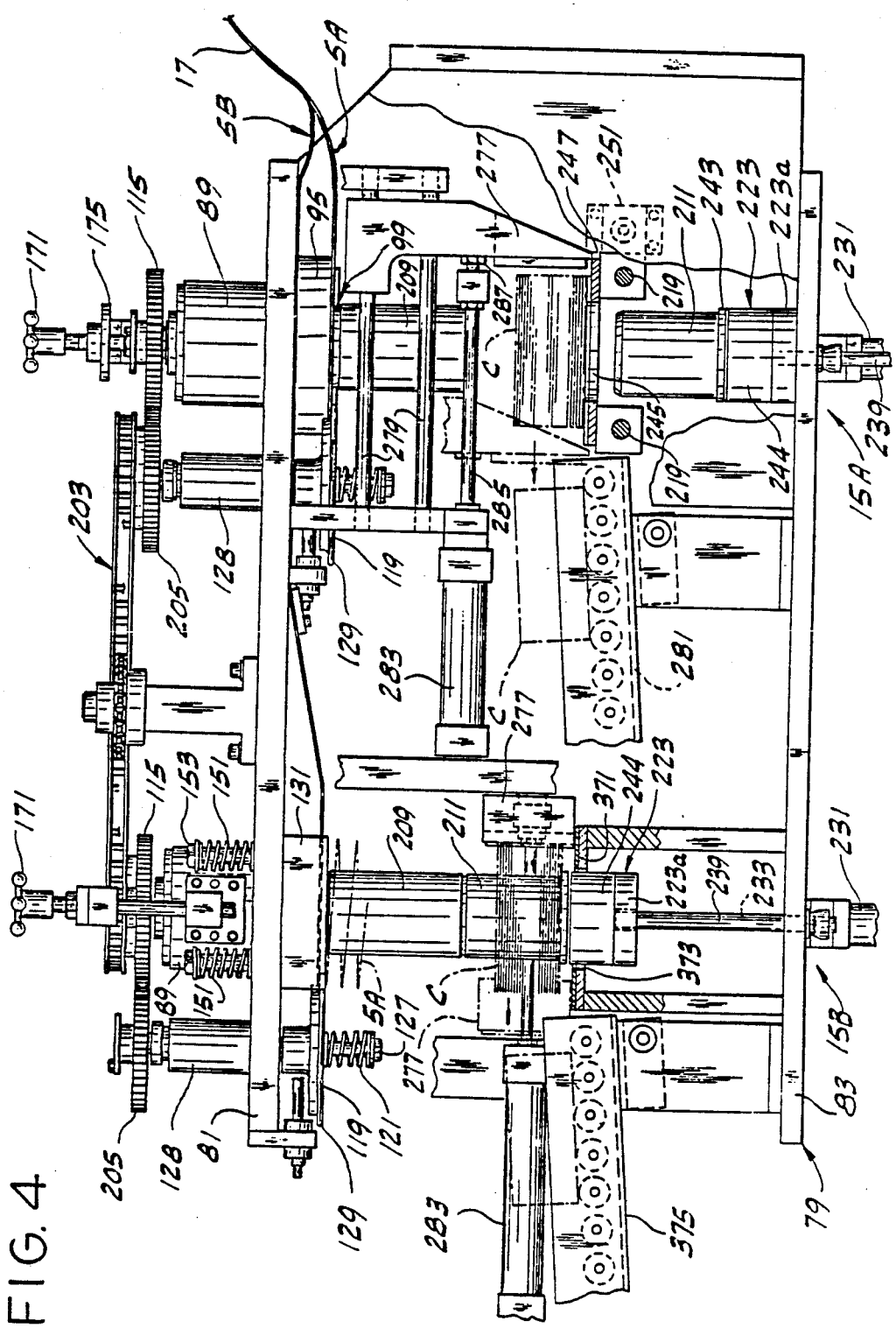
FIG. 4 is an enlarged partial side elevational view of the apparatus taken from FIG. 1 illustrating winding means of the apparatus with parts thereof being broken away for clarity.

In accordance with an aspect of this invention, a looped portion of strips 5A, 5B is provided, as indicated at 17 in FIGS. 1, 1A and 4, between operation station 1 and winding stations 15A, 15B. Looped portion 17 is such as to enable continuous feed of continuous strips 5A, 5B from the looped portion to winding stations 15A, 15B during each dwell of strip stock 3 between successive intermittent feed cycles (when the strip stock and the initial portion of the continuous strips just upstream from and leading into the looped portion are stationary) and also during such feed cycles (when the strip stock and said portion of the continuous strips are moving) for the continuous winding of the continuous strips. Thus, looped portion 17 enables transition from the intermittent feed of strip stock 3 to the continuous feed of strips 5A, 5B to winding stations 15A, 15B. As will appear, the rate at which each strip 5A, 5B is wound at winding stations 15A, 15B relative to the rate at which it is fed from operation station 1 into looped portion 17 is varied upon increase or decrease in the size of the looped portion to maintain the looped portion of each strip for transition from the intermittent feed thereOf from the operation station into the looped portion to the continuous feed of the strip out of the looped portion to the respective winding station. As shown in FIG. 1 and also in FIG. 1A, strips 5A, 5B are looped at .17 before they separate for being wound.

The division of strip stock 3 at operation station 1 into strips 5A, 5B with their teeth 9 and slots 11 is effected by a means for lancing the strips, such as a punch press generally designed 19 or the like for instance, which is shown in FIG. 1 as comprising a bed 21 mounted in a frame 23 standing on floor F. This may be a standard commercially available press such as a PULSAR press sold by Minster Press Co. of Minster, Ohio. Press 19 includes a die 25 mounted on bed 21 of the press, and the die has a set of openings indicated in its entirety at 27 in FIG. 2 for receiving a set of punches 29 (see FIGS. 1 and 2) to punch out portions of strip stock 3 on each cycle of the press to lance or effect the division of the stock into strips 5A, 5B with the formation of teeth 9 and slots 11 thereof. Punches 29 are carried by vertically reciprocable press head 31 which is driven upwardly and downwardly through return and punch strokes by conventional press mechanism indicated schematically by a dotted line at 33 in FIG. 1 and driven by a continuously rotating press shaft or continuous driving means 35. A stripper or pressure plate 37 (see FIG. 3) carried by press head 31 is backed by springs 39 to apply pressure to strip stock 3 on die 25 as press head 31 comes down. Strip stock 3 is intermittently fed over die 25 in increments appropriate to die openings 27 for forming teeth 9 and slots 11 for each of strips 5A, 5B, and this feed is effected by feeding means, such as a pair of intermittently operable stock feed rolls or the like for instance as indicated at 41 in FIG. 1, intermittently driven from press shaft 35 by a conventional mechanism as indicated schematically by a dotted line at 43 in FIG. 1.

Figure 2:
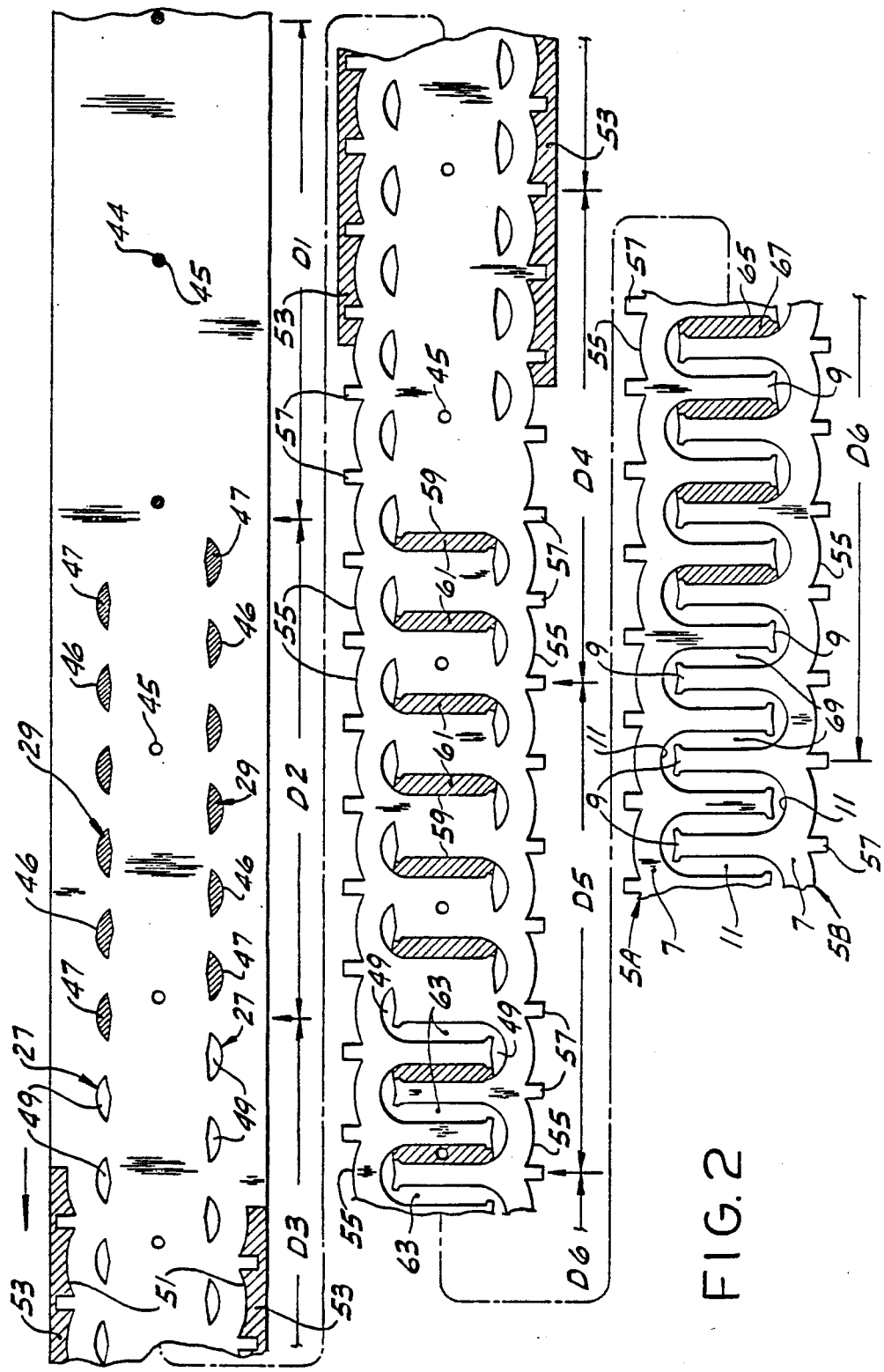
FIG. 2 is a partial plan view illustrating lancing steps involved in dividing of strip stock of a ferromagnetic material at an operating station of the apparatus into two continuous strips each having a preselected configuration.

As illustrated in FIG. 2, die 25 is in effect divided into a series of six die zones D1–D6 extending in the direction of the feed of strip stock 3 over the die, and each of these zones has a length corresponding generally to six times the spacing or pitch of teeth 9 of one strip (twelve times the spacing of adjacent teeth); however, it is contemplated that other such zones having different lengths corresponding to different pitch for the teeth may be utilized within the scope of the invention so as to meet at least some of the objects thereof. Feed rolls 41 act intermittently to feed over die 25 a length of strip stock 3 referred to as the index length corresponding to the zone length or six times the pitch of the teeth, with a dwell of the strip stock feed occurring between successive feed cycles thereof. With reference to the index length corresponding to six times the pitch of the teeth, it is to be noted that the invention is herein illustrated as it relates to the formation of the cores C with twenty-four teeth 9 and twenty-four slots 11: however, it is contemplated that other cores having various other configurations and different numbers of teeth and slots may be formed within the scope of the invention so as to meet at least some of the objects thereof. Each helical convolution of a core C thus has twenty-four teeth and twenty-four slots which are generated on four successive indexing steps. Punches 29 are, of course, raised during the dwell to accommodate the feed of strip stock 3. In the first zone D1, field pins 44 punch holes 45 in strip stock 3. In the second zone D2, die 25 has an arrangement of lenticular openings therein, such as indicated at 46, and press head 31 has a corresponding arrangement of punches 47 for punching lenticular openings 49 in strip stock 3 in two rows thereby to form concave inner ends for slots 11 and generally straight inner ends for the tips of teeth 9. In third and fourth zones D3, D4, die 25 has an arrangement of openings 51, and press head 31 has a corresponding arrangement of punches 53 for punching out portions of strip stock 3 to form scallops 55 at the outer edges of the strips extending between outwardly projecting tongues or lands 57. In fourth and fifth zones D4, D5, die 25 has an arrangement of openings 59, and press head 31 has a corresponding arrangement of punches 61 for punching narrow transverse slots 63 in strip stock 3 extending between pairs of lenticular openings 49 to form first spaces at 63 between teeth 9. And in the fifth and sixth zones D5, D6, die 25 has an arrangement of openings 65, and press head 31 has a corresponding arrangement of punches 67 for punching narrow transverse slots 69 in strip stock 3 extending between the aforementioned paired lenticular openings 49 to form second spaces at 69 between teeth thereby to complete the division or lancing of strip stock 3 into continuous strips 5A, 5B, as illustrated at the bottom of FIG. 2. Punches 29 all come down simultaneously in the above discussed several zones with press head 31 and are then raised to open press 19 for the feed of the stock one index length. The operation is such that the formation of teeth 9 and slots 11 takes place in steps as strip stock 3 is indexed through the successive zones, and the strip stock is ultimately completely lanced into strips 5A, 5B each with its teeth 9 and slots 11 in zones D5 and D6. Although press 19 is illustrated herein to effect the lancing of strips 5A, 5B from stock 3, it is contemplated that various other lancing means or presses may be utilized to lance either one strip of the stock into the desired configuration thereof or to lance a plurality of the strips from the stock within the scope of the invention so as to meet at least some of the objects thereof.

Figure 3:
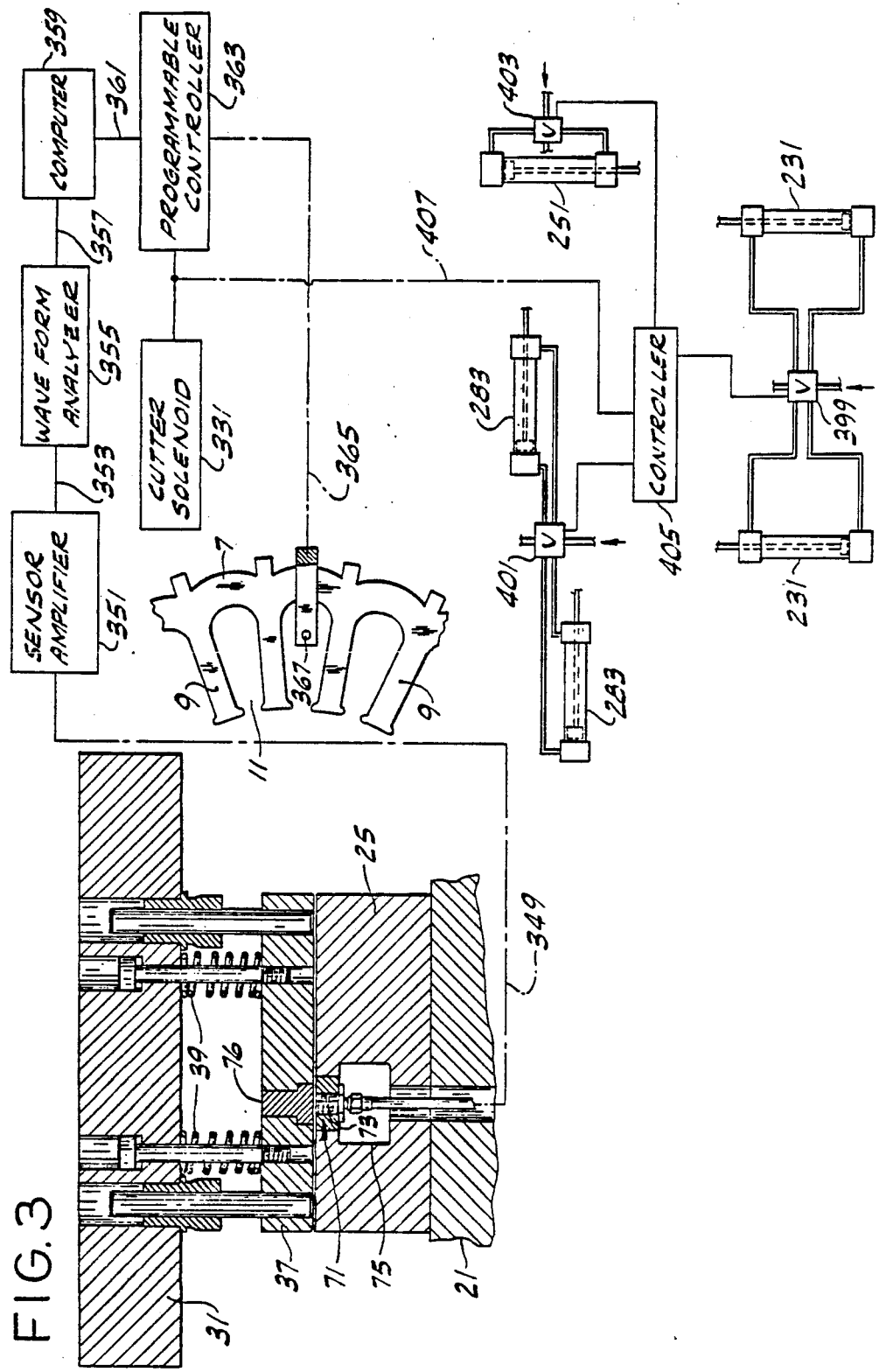
FIG. 3 is a partial schematic view and a partial sectional view illustrating certain details of the apparatus of FIG. 1 for punching out portions of the strip stock to divide it into the two continuous strips including means for sensing strip thickness and also showing diagrammatically an electric and a pneumatic circuit controlled by the sensing means.

Associated with die 25 and stripper or pressure plate 37 is means indicated generally at 71 in FIG. 3 for measuring the thickness of strip stock 3 on the die since the thickness may vary from section-to-section lengthwise thereof and from roll-to-roll of stock 3 from which the strips are lanced. Measuring means 71 comprises an eddy current type of sensor 73, such as for instance a KD-2611-28 sensor available from Kaman Sciences Corporation of Colorado Springs, Colo., set in an opening 75 at the top of die 25, in vertical alignment with an aluminum insert 76 in plate 37 which is made of steel. Sensing means or sensor 73 is laterally offset from the strip material. When press head 31 is driven downwardly through a working stroke and plate 37 comes into spring-pressured engagement with the top of strip stock 3 on die 25 thereby to press it onto the upper face of the die, sensor 73 generates an electrical signal related to the height of the gap between the upper face of the die and the lower face of the plate and hence related to the thickness of strip stock 3. The purpose of this is to control the thickness in axial direction of edgewise wound cores C, this thickness being determinative of the stack height of the edgewise wound cores formed on the apparatus, all as will appear.

Strips 5A, 5B are formed by the above discussed punching or lancing operation feed from zone D6 at the exit end of die 25 in coplanar interdigitated relation in a generally horizontal plane at the top of the die concomitantly with the feed thereto of strip stock 3 by feed rolls 41. Strips 5A, 5B advance intermittently from die 25 one index length on each feed cycle, and upon passing from the die, the strips deflect upwardly into looped portion 17, which is a single free loop including both strips and which is maintained for transition from the intermittent feed of strip stock 3 through press 19 to the continuous feed of the strips to winding stations 15A, 15B. Coming out of looped portion 17, strips 5A, 5B are vertically separated, the teeth of each strip being vertically displaced from the slots of the other, and the strips then travel in offset paths, as best seen at the upper right of FIG. 4, to winding stations 15A, 15B with strip 5B traveling above strip 5A. Each strip remains generally in the same plane in which it was generated in press 19 so as to at least limit twisting and lateral deflection of the strips passing to winding stations 15, 15A and thereby avoid stresses and strains which might deleteriously affect the magnetic characteristics of the material.

Strips 5A, 5B are continuously edgewise wound into helices or a plurality of helical convolutions (i.e., formed into edgewise wound cores C) by a plurality of winding or deforming means, such as for instance a pair of winders 77A, 77B at winding stations 15A, 15B. In each case, the strip is wound with band 7 on the outside, forming the yokes of the cores being made, and with teeth 9 extending radially inwardly. Winders 77A, 77B are mounted in a frame structure generally designated 79 which includes an upper horizontal plate 81 and a lower horizontal plate 83 supported on press 19 generally at its exit side. Winder 77A comprises rotatable means which includes a tubular spindle or mandrel 85 (see FIG. 7) journalled for rotation on a vertical axis in bearings 87 in a tubular bearing block 89 mounted on upper frame plate 81 and extending upwardly therefrom, and the spindle has a circular flange 93 adjacent its lower end below the upper frame plate. An annular head or ring 95, such as for instance a friction drive wheel or disc or the like is secured to flange 93 adjacent the lower end thereof for rotation with spindle 85 on the spindle axis. This head or ring has a flat horizontal annular bottom or gripping surface 97 and is in the nature of a flywheel acting as a friction drive wheel or gripping means for gripping engagement with an opposite face of strip 5A as will appear. At 99 is indicated a mandrel around which strip 5A is bent generally edgewise thereof to form it into a helix as will appear. Mandrel 99 is rotatable with spindle 85 on the spindle axis and is adjustable upwardly and downwardly relative to the spindle. An upper cylindric section 101 (see FIG. 9) on mandrel 99 is slidable vertically in a central opening 103 of drive wheel 95, and a lower section 103 of the mandrel is of varying diameter. More particularly, lower section 103 is of a frusto-conical form having a conic surface convergent generally in a downward direction from upper cylindric section 101. Mandrel 99 is secured by a cross-pin 105 to an enlarged lower end 107 of a mandrel adjusting stem 109 which is vertically slidable in tubular spindle 85. Enlargement 107 itself is slidable in an enlarged lower end extension 111 of spindle 85 which has a plurality of vertical slots 113 receiving cross-pin 105 for keying the mandrel to spindle 85. Spindle 85 has a gear 115 adjacent its upper end which is driven through a drive train indicated generally at 117 (see FIGS. 1 and 5), to be more particularly described.

Figure 10:
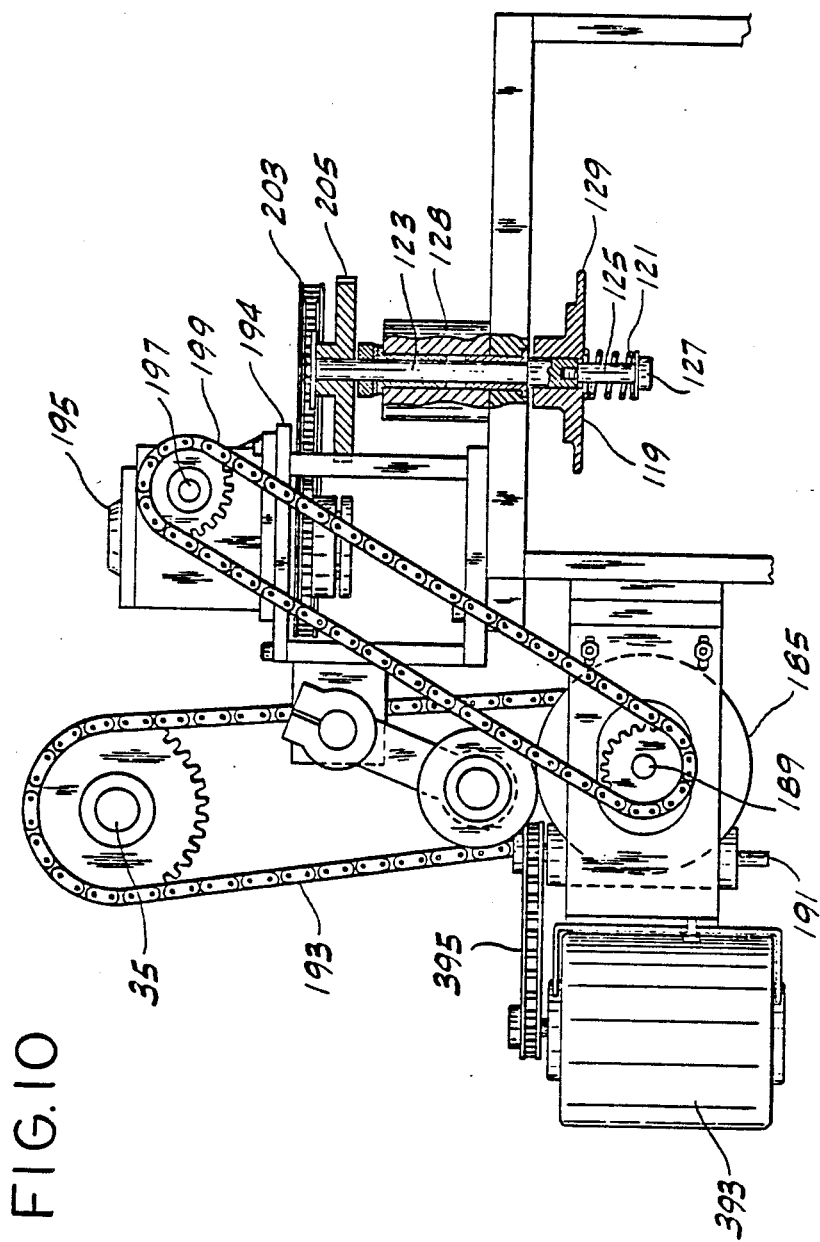
FIG. 10 is a partial sectional view taken along line 10—10 of FIG. 5 with parts broken away for clarity.
Figure 12:
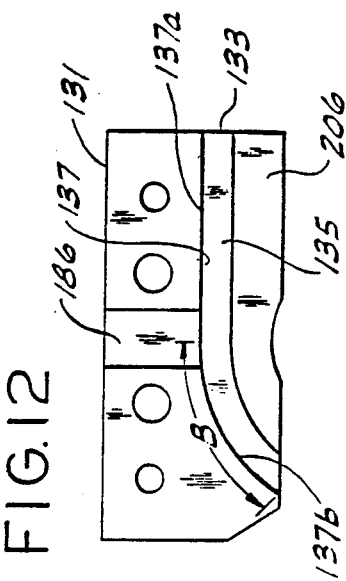
FIG. 12 is a plan view of a strip guide per se of the apparatus of FIG. 1.
Figure 11:
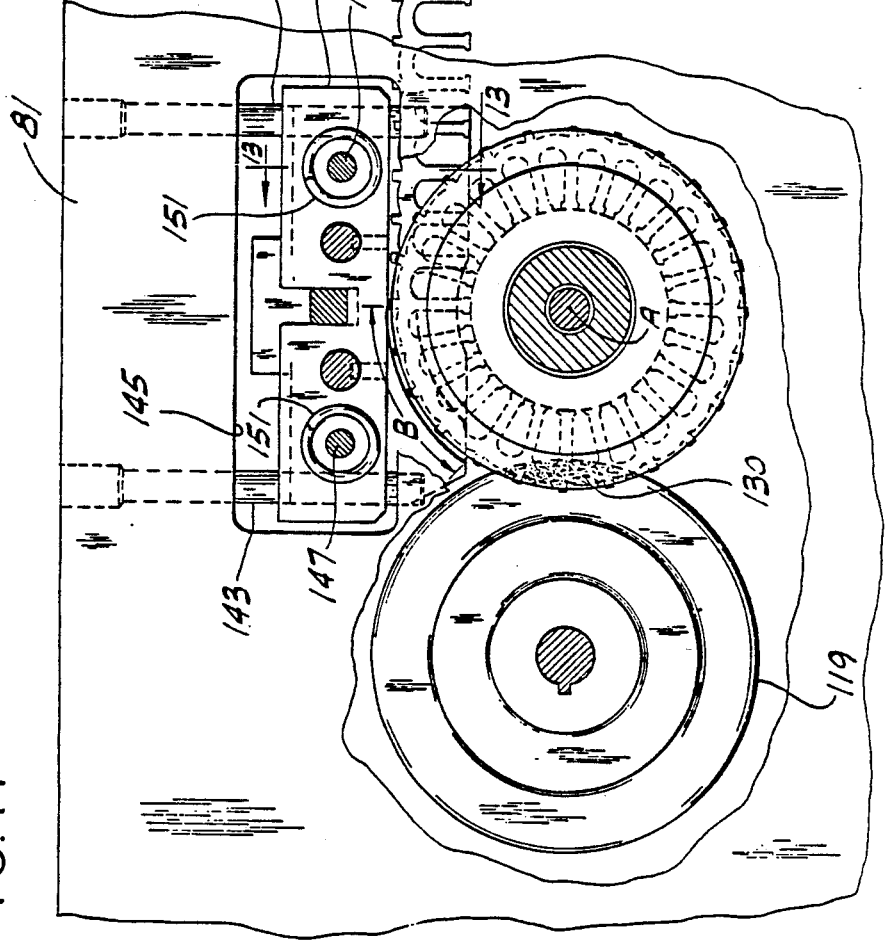
FIG. 11 is an enlarged fragmentary view of FIG. 5 with parts broken away for clarity.

Friction drive wheel 95 at the lower end of spindle 85 comprises a part of means for drawing strip 5A through at least a part of winder 77A defined by a bending or deforming zone indicated at B in FIGS. 11 and 12 in which the strip is constrained to bend edgewise around an axis A of the bending zone which corresponds to that of spindle 85, head 95 and mandrel 99 (the winding axis) for generally edgewise deforming the strip into a helix. This strip drawing means, in addition to wheel 95, comprises other rotatable means, such as a rotary presser wheel 119 or the like for instance, which may also be referred to as the pinch wheel having a surface or gripping means biased by a spring or spring means 121 (see FIG. 10) to press against an opposite face of strip 5A in gripping engagement therewith, more particularly against band portion 7 of the strip so as to engage the strip generally flatwise as it travels beyond bending zone B against bottom face 97 of drive wheel 95 rotating on axis A. Pinch wheel 119 is keyed to a shaft 123 for rotation therewith and is axially slidable on the shaft, and the compressive force of spring 121 as disposed about pin 125 threaded in the end of the shaft is exerted upwardly against the pinch wheel from a head 127 on the pin. Shaft 123 is journalled in a vertical bearing 128, and pinch wheel 119 is positively driven along with the spindle 85, drive wheel 95 and mandrel 99 via a drive train as will appear. Pinch wheel 119 has a rim 129 lapping bottom face 97 of friction drive wheel 95 over the area indicated at 130 in FIG. 11, which may be referred to as a pressing or gripping zone.

As strip 5A is drawn through bending zone B, it is constrained to bend edgewise around mandrel 99 by a strip guide or deforming means 131 (see especially FIGS. 7, 9, 12 and 13), which may also be referred to as a deforming or bending guide or tool, comprising an elongate metal block having a flange 133 forming a recess 135 in one side thereof. A bending surface or edge 137 of guide 131 in recess 135 thereof is engageable by an opposite edge of strip 5A which is illustrated herein for purposes of disclosure as being on lands 57 of the strip, and the bending edge is shaped to bend the strip generally edgewise thereof generally into a circle or helical convolution around mandrel 99. This bending occurs in a horizontal plane P (see FIGS. 7 and 13), which may be referred to as the bending or winding plane, immediately adjacent and below bottom face 97 of friction drive wheel 95. For this purpose, bending edge 137 is straight for an initial or entrance portion of its length, as indicated at 137a in FIG. 12, and then becomes curved or arcuate for a portion of its length, as indicated at 137b, the curvature being such as to effect the aforementioned requisite edgewise bending of the strip. In general, the radius of curvature of portion 137b of bending edge 137 at its exit end corresponds to the desired external radius for a finished edgewise wound core.

Figure 13:
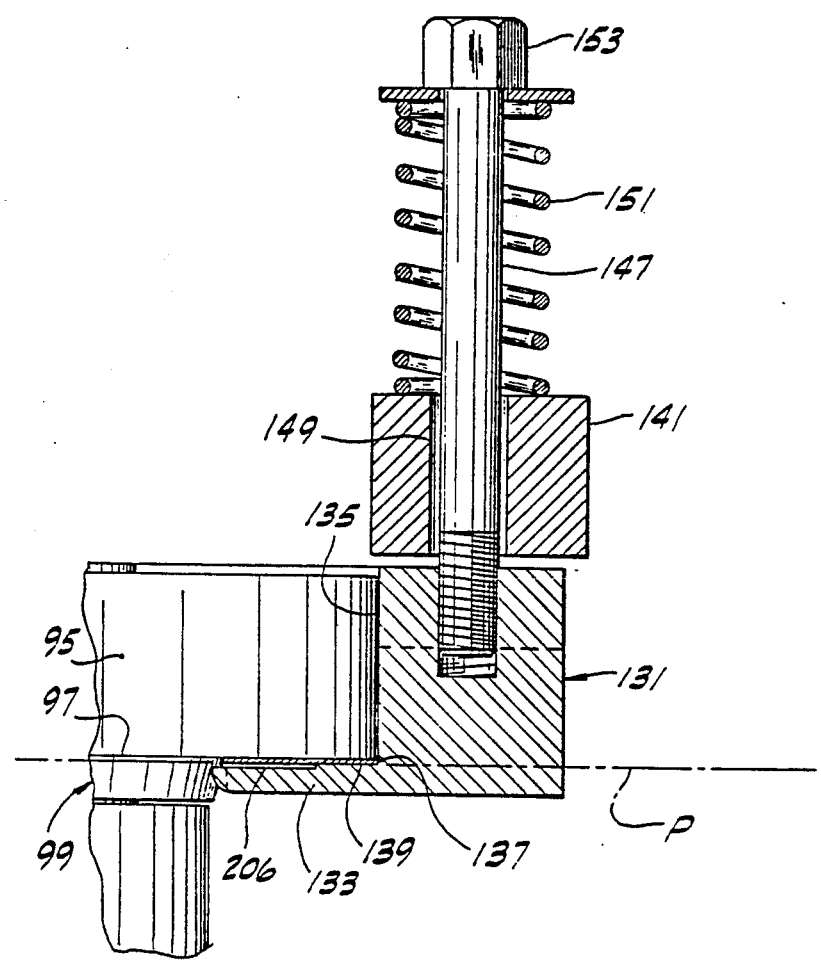
FIG. 13 is an enlarged partial sectional view taken along line 13—13 of FIG. 11.
Figure 14:
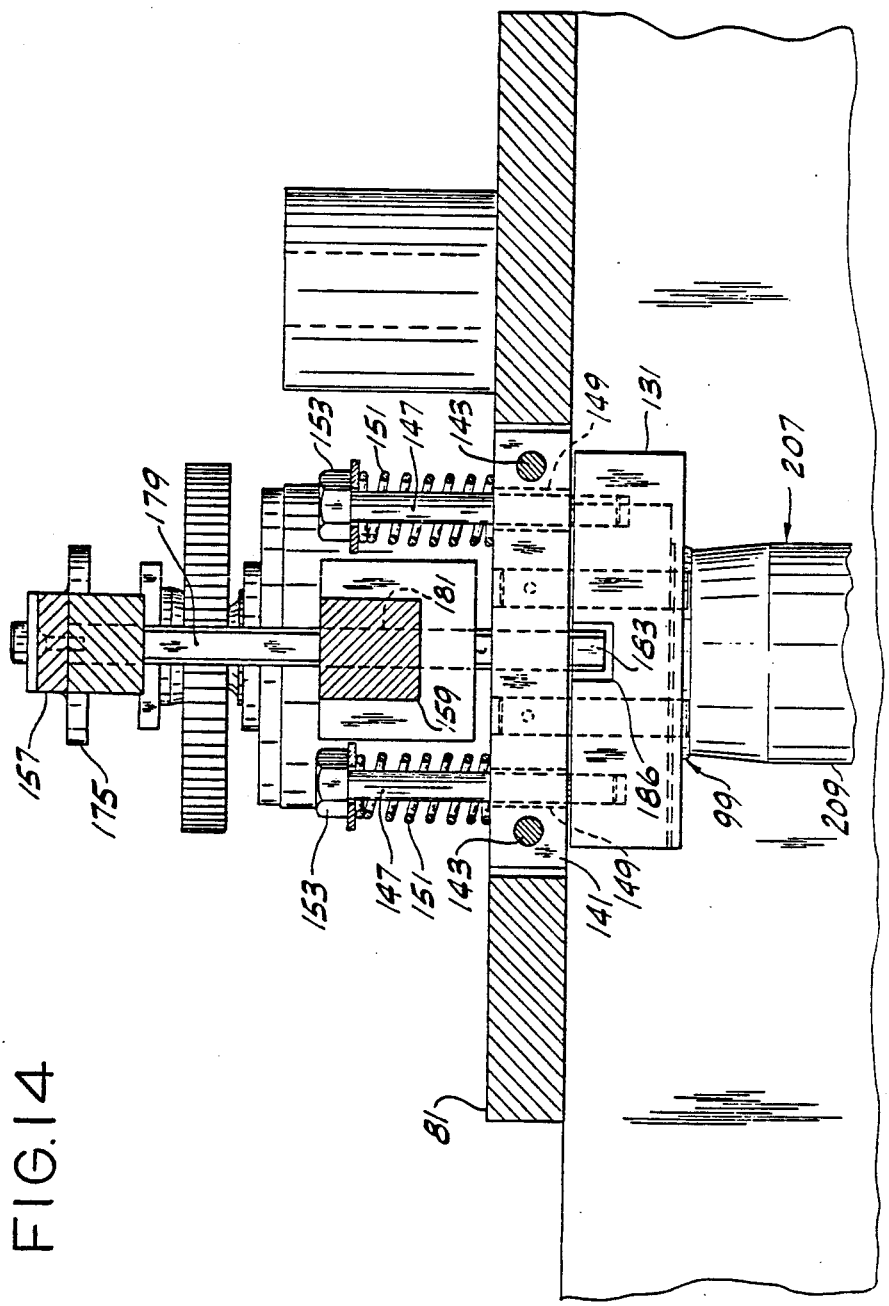
FIG. 14 is an enlarged partial sectional view taken along line 14—14 of FIG. 7.

Bending guide or tool 131 is adjustable horizontally in and out relative to mandrel 99 and, in addition to being so adjustable, is spring-biased upwardly to effect spring-pressure engagement, as indicated at 139 in FIG. 13, of the inside face of its flange 133 with strip 5A, and more particularly with band portion 7 of the strip thereby to confine the strip generally flatwise between the inside face of the flange and the bottom face of wheel 95 and restrain the strip from buckling. For this purpose, bending guide 131 is carried by a slide 141 which is horizontally slidable toward and away from mandrel 99 on a pair of horizontal guide rods 143 mounted in an opening 145 in upper plate 81. Bending guide 131 is also mounted for vertical movement relative to slide 141 by means of a pair of pins 147 extending slidably in holes 149 in the slide, the bending guide being biased upwardly toward wheel 95 by means of springs 151 surrounding pins 147 and exerting their compressive forces upwardly from the slide against heads 153 on the pins.

Means indicated generally at 155 (see FIG. 7) is provided for adjusting mandrel 99 axially upwardly and downwardly to present different winding diameters on the conic surface of lower section 103 of the mandrel in winding plane P and for adjusting bending guide 131 horizontally toward and away from the mandrel to compensate for such vertical adjustment of the mandrel diameter in the winding plane P, i.e., to maintain the proper spacing of bending edge 137 on the bending guide from the mandrel for the effective width of strip 5A between the opposite edges thereof. These adjustments may be made to accommodate spring-back of the helical convolutions of the strip so that edgewise wound cores C may be made to a preselected final diameter, as will be explained hereinafter. Since lower section 103 of mandrel 99 is of frusto-conical form as illustrated, the winding diameter of the mandrel in winding plane P is increased on downward adjustment of the mandrel and increased on upward adjustment thereof. Bending guide 131 is adjusted outwardly on increase in the effective mandrel diameter and inwardly on the decrease thereof. Although conic surface on lower section 103 of mandrel 99 is shown and described herein for purposes of disclosure, it is understood that a generally cylindric surface may be employed in place of such conic surface within the scope of the invention so as to meet at least some of the objects thereof, and in the event such cylindric surface is employed, then the adjustment of the mandrel would become moot. As appears to advantage in FIG. 7, adjusting means 155 comprises an adjustment carriage 157 mounted for vertical adjustment movement relative to a bracket 159 carried by bearing block 89 by means of a guide rod 161 slidable in a hole 163 in the bracket. Carriage 157 is movable up and down for adjustment by means of an adjustment rod 165 mounted as indicated at 167 for rotation in bracket 159 and threaded into a tapped hole 169 in the carriage, and the rod has a knob 171 at its upper end for turning it for adjustment upon loosening a lock nut 173. Mandrel adjusting stem 109 has a collar 175 adjacent its upper end received in a groove 177 in carriage 157, and this arrangement permits rotation of stem 109 while enabling up and down adjustment of the stem and mandrel 99 by the carriage. For in and out adjustment of bending guide 131, slide 141 carrying the guide is slidable in and out on rods 143 by a cam bar 179 extending downwardly from carriage 157 through a hole 181 in bracket 159. Cam bar 179 has an angled lower end portion 183 forming a cam slidable in an angled slot 185 in slide 141, and which extends downwardly into a notch 186 in guide 131. Thus, upon upward movement of carriage 157 and cam bar 179, slide 141 and bending guide 131 are moved inwardly toward mandrel 99 a distance corresponding to the concomitant decrease in the effective winding diameter of mandrel 99 and vice versa. The mandrel and guide adjustment, as described, is a manual adjustment. It may be automated, as will be later described. Also, it is contemplated that the interconnection of carriage 157 and the mandrel adjusting stem may be omitted and the mandrel and guide adjustments may be made independently of one another within the scope of the invention so as to meet at least some of the objects thereof.

Figure 5:
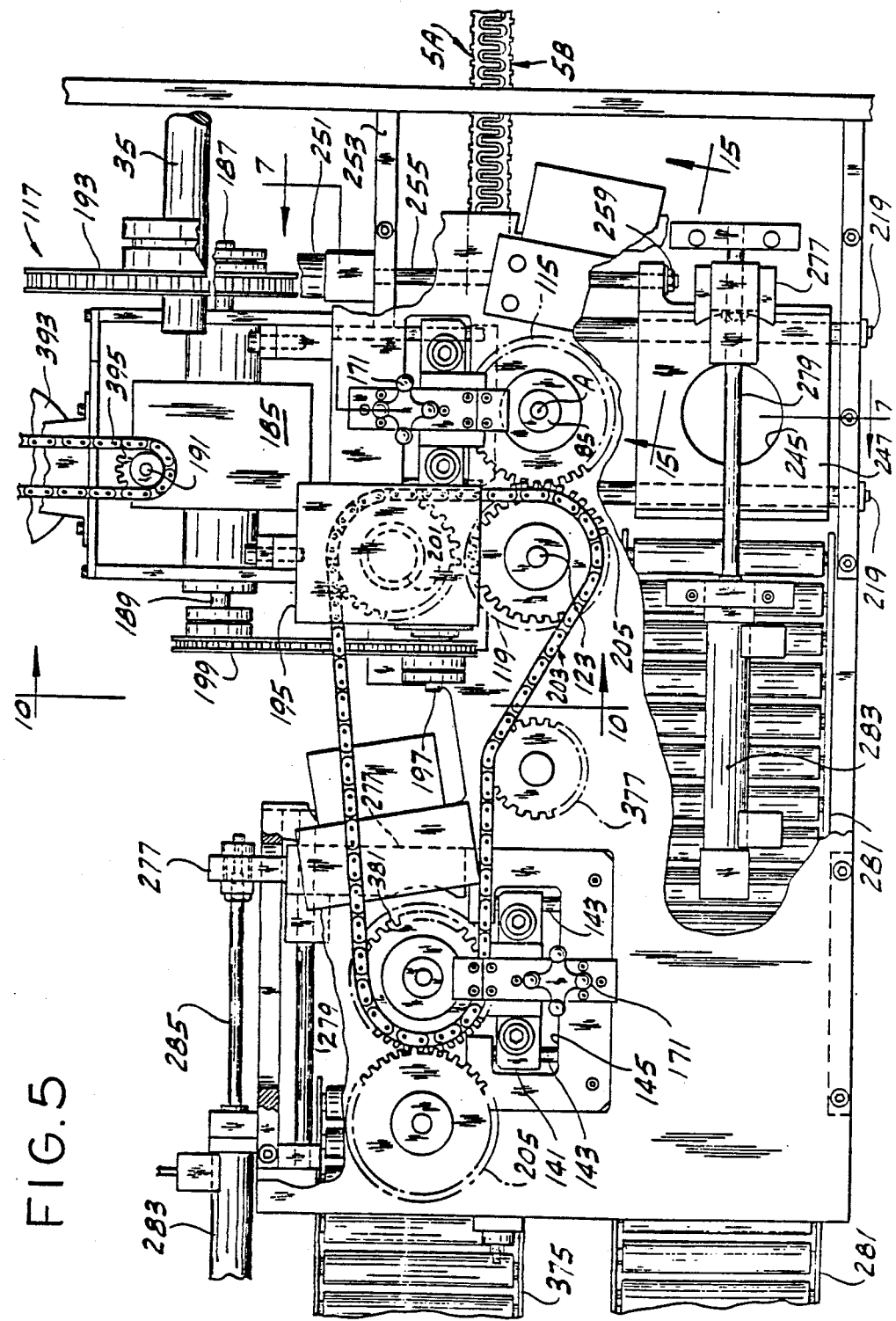
FIG. 5 is a partial plan view of the apparatus taken from FIG. 4 with parts broken away for clarity.

As illustrated in FIGS. 5 and 10, the aforesaid drive 117 is taken off press shaft 35, and includes variable drive means, such as a speed changer 185 or the like for instance preferably of the differential type, having an input shaft 187, an output shaft 189, and a speed change shaft 191. Input shaft 187 is adapted to be constantly rotated or continuously driven at a speed or rate related to the press shaft speed by a chain and sprocket drive 193 from press shaft 35. Mounted on a platform 194 on top of upper frame plate 81 is a right angle drive 195 having a horizontal input shaft 197 driven by a chain and sprocket drive 199 from speed changer output shaft 189 and a downwardly extending output shaft 201. At 203 is indicated a chain and sprocket drive taken off right angle drive output shaft 201 and driving pinch wheel shaft 123 of winder 77A. Pinch wheel shaft 119 has a gear 205 in mesh with spindle gear 115 for driving spindle 85 of winder 77A.

Figure 9:
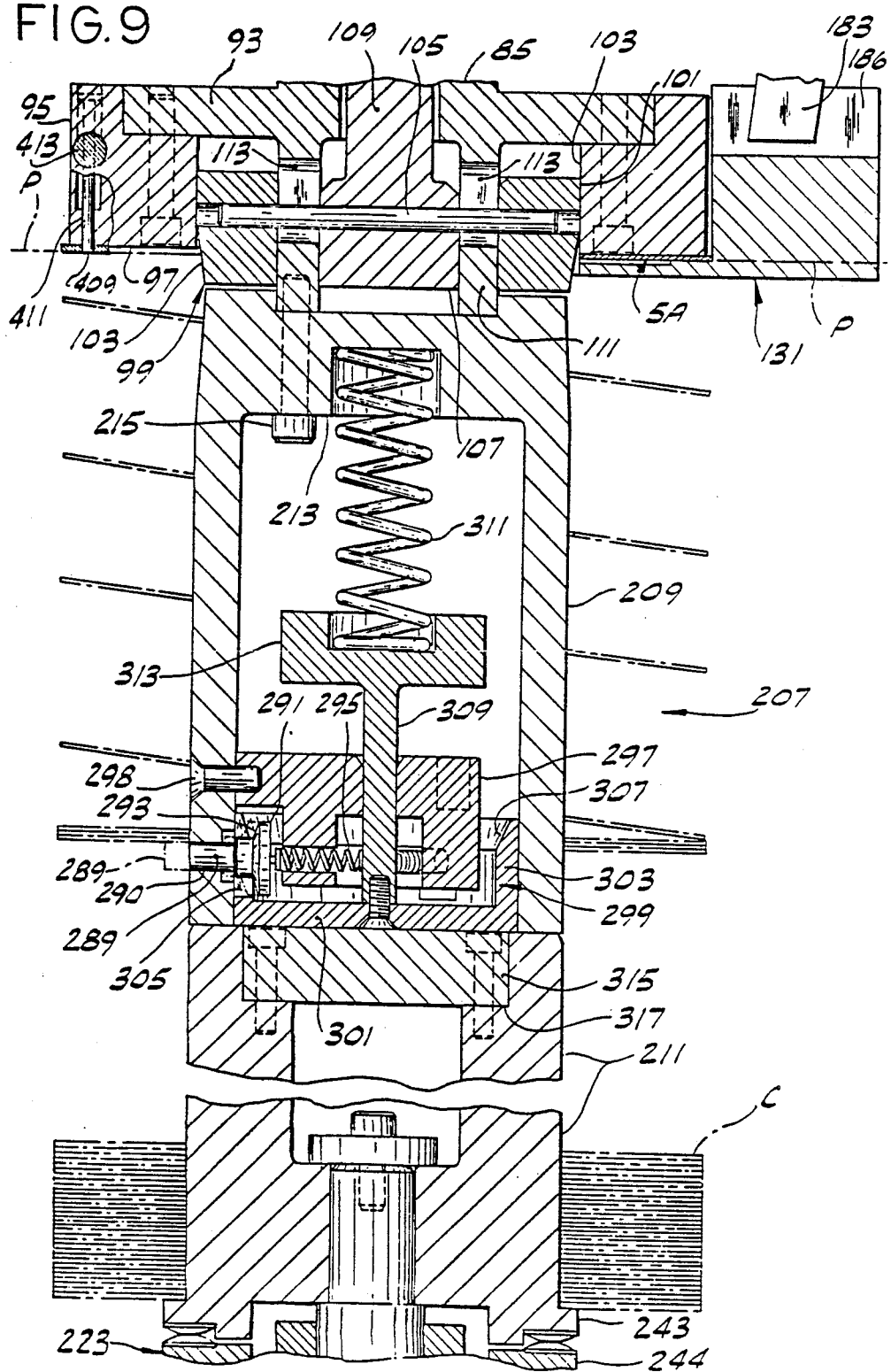
FIG. 9 is an enlarged fragmentary view taken from FIG. 7.

From the above and as may be best seen in FIGS. 9 and 11–13, it will appear that in winder 77A strip 5A is bent to form it into a helix or helical convolutions by bending guide 131 around mandrel 99 in winding plane P at the bottom face of friction drive wheel 95. Strip 5A is guided in a horizontal path in winding plane P between the inside (upper) face of bending guide flange 133 and bottom face 97 of wheel 95. With bending guide 131 biased by springs 151 in the direction toward wheel 95 (upwardly), the opposite faces of strip 5A generally at yoke section or continuous band portion 7 thereof are confined flatwise at 139 between the upper face of the flange and the bottom face of drive wheel 95 to prevent the strip from buckling, and the opposite edges of the strip are confined between bending edge 137 of guide 131 and conic surface 103 of mandrel 99, being thereby constrained to be bent edgewise around the mandrel and formed into a helix. Flange 133 may be relieved, as indicated at 206 in FIG. 13, so that teeth 9 of strip 5A are not contacted by the flange. As strip 5A exits from bending guide 131, it (more particularly its opposite faces or band portion 7) remains confined flatwise between wheels 119 and 95 so as to be gripped thereby, but as the strip passes by wheel 119, the strip is released from confinement so that each helical convolution generated from the strip is released from confinement for helical progression of the helical convolutions downwardly away from mandrel 99 and wheel 95 for accumulation in a generally axial and generally annular stack thereof to form an edgewise wound core C wherein the convolutions lie flatwise one on another, as seen in FIGS. 9 and 11. The successive helical convolutions progress helically downwardly away from mandrel 99 and wheel 95 surrounding what may be termed a split arbor or receiving and accumulating means generally designated 207 associated with the mandrel on winder axis A.

Split arbor 207 comprises a pair of relatively movable means adapted for separation, such as for instance an upper arbor section or receiving means 209 which is secured to mandrel 99 for rotation therewith on winder (mandrel) axis A and a lower arbor section or stripping arbor, such as for instance, a separable or accepting means 211 or the like, which receives the helical convolutions in the axial stack thereof forming an edgewise wound core C. Lower arbor section 211 is separable from upper arbor section 209 by displacing or moving it downwardly toward a displaced or separated position away from the upper section for removal of an edgewise wound core C. As shown in detail in FIGS. 8 and 9, arbor section 209 is a hollow, generally cylindric and elongate sleeve closed at its upper end, as indicated at 213, and secured at its upper end to spindle extension 111, as indicated at 215. Upper arbor section 209 is shown in FIG. 9 as having a somewhat larger diameter than the lower end of mandrel 99 (the small end of the mandrel) with a slight taper 217 extending from the upper end downwardly to the diameter of the lower end of the mandrel to facilitate the downward progression of the helical convolutions of the strip off the mandrel away from wheel 95 and into generally loose surrounding relation with respect to the split arbor.

Lower arbor section 211 is also a generally cylindric and elongate sleeve or member of generally the same diameter as the main body of upper arbor section 209 and arranged generally in axial alignment therewith. Lower arbor section 211 is conjointly movable with an elevator 223 on which it is mounted for rotation about winder axis A by means of a bearing 225. The arrangement is such that lower arbor section 211 is movable upwardly into its raised or at-rest position, as illustrated in solid lines in FIGS. 7 and 9, wherein the upper or free end of the lower arbor section is in engagement with the lower or free end of upper arbor section 209, and elevator 223 is operable to move the lower arbor section downwardly to its displaced or lowered position, as illustrated in FIG. 4. Elevator 223 is reciprocally movable to move lower arbor section 211 between its raised and lowered positions by means of an air cylinder 231 secured to the bottom of frame plate 83 so as to extend downwardly from the latter, and a piston rod 233 of the air cylinder extends through a hole 235 in the plate into connection at 237 with the elevator. The latter is guided for its stated up and down movement by means of guide rods 239 extending from the elevator and slidable in bushings 241 in plate 83.

Lower arbor section 211 has an outwardly extending flange or supporting means 243 at its lower end forming a ledge on which the axial stack of helical convolutions for forming an edgewise wound core C rests, and the outside diameter of flange 243 may be, if desired, substantially less than the outside diameter of the axial stack or core so that the latter projects beyond the flange. Elevator 223 has a base 223a and an upwardly extending hollow cylindric housing 244 for bearing 225. When elevator 223 is in its raised position of FIG. 7 holding lower arbor section 211 in its raised position, cylindric housing 244 is situated in an opening 245 in a core transfer carriage 247 mounted for horizontal sliding movement transversely with respect to axis A of winder 77A. Carriage 247 is movable between a retracted position, as illustrated in solid lines in FIG. 7, and an advanced position, as illustrated in phantom in FIG. 7, on a set of horizontal guide rods 219 mounted in the frame structure of the apparatus, as illustrated in FIGS. 4 and 5. Carriage 247 is movable between its stated retracted and advanced positions by means of an air cylinder 251 secured to a vertical frame plate 253, and a piston rod 255 of the air cylinder extends through a hole 257 in this plate into a connection at 259 with the carriage.

Figure 15:
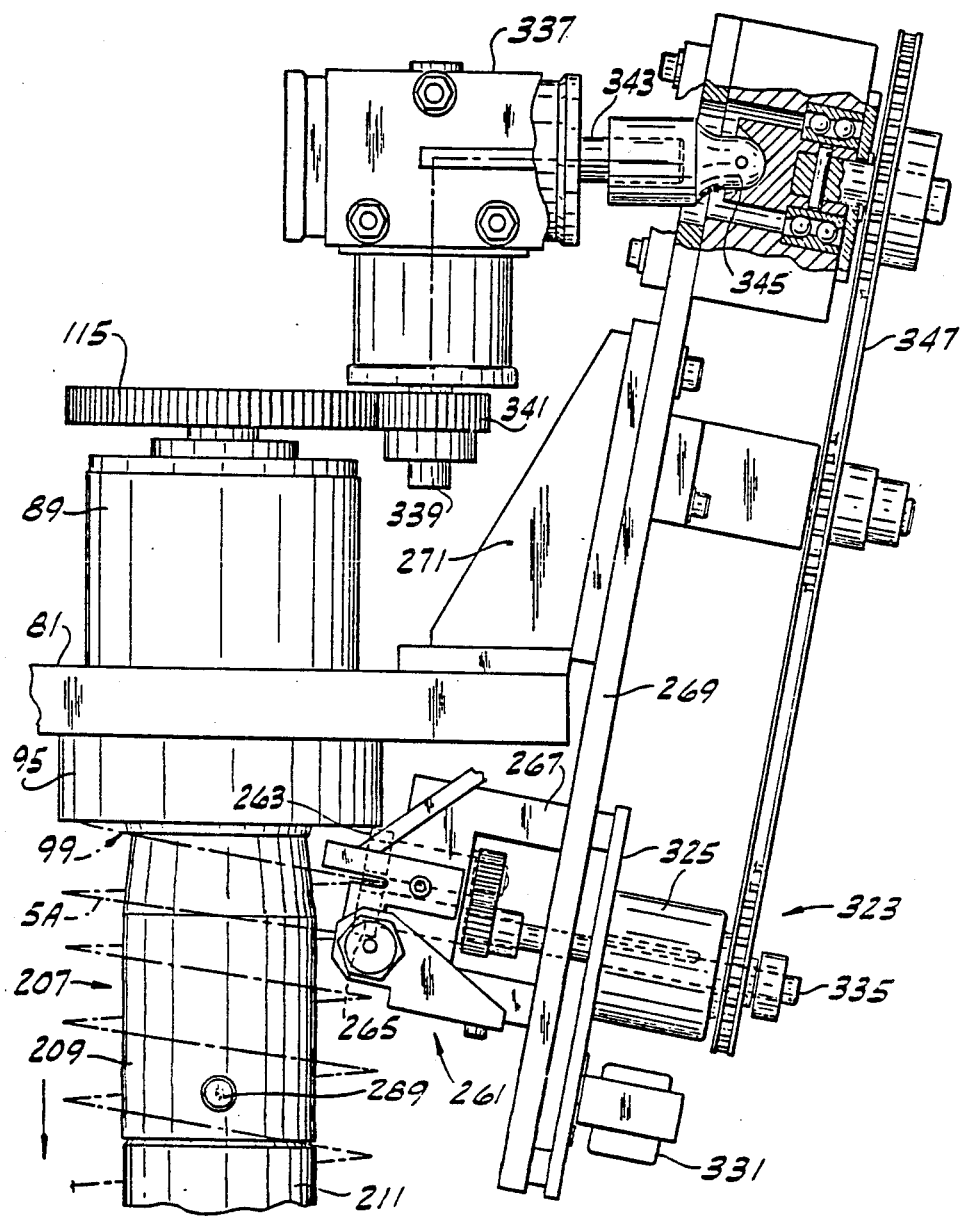
FIG. 15 is an enlarged partial sectional view taken along line 15—15 of FIG. 5 with parts broken away for clarity.
Figure 16:
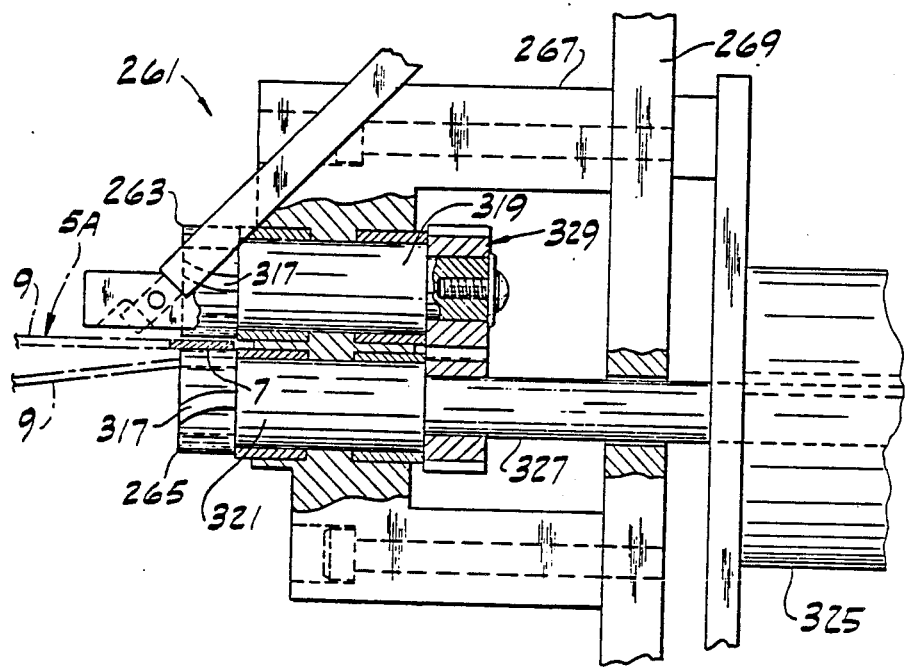
FIG. 16 is an enlarged fragmentary view taken from FIG. 15 with parts broken away and shown in section.

Strip 5A, after having been bent or deformed to form the helical convolutions, progresses helically downwardly around the circumferential surface of split arbor 207 of winder 77A and travels through a strip cutter or severing means indicated generally at 261 in FIGS. 15 and 16 for cutting the strip when the accumulated thicknesses of the helical convolutions in an axial stack thereof defining an edgewise wound core C attain the preselected stack height therefor. Cutter means 261 includes a pair of rotary cutters 263, 265 mounted for rotation adjacent each other on generally parallel inclined axes in a cutter frame 267 mounted on an inclined mounting plate 269 carried by a bracket 271 on plate 81, and these cutters are located just below drive wheel 95 in position for travel of the just-bent helical convolutions of strip 5A therebetween as such helical convolutions pass from between wheels 95, 119.

Figure 7:
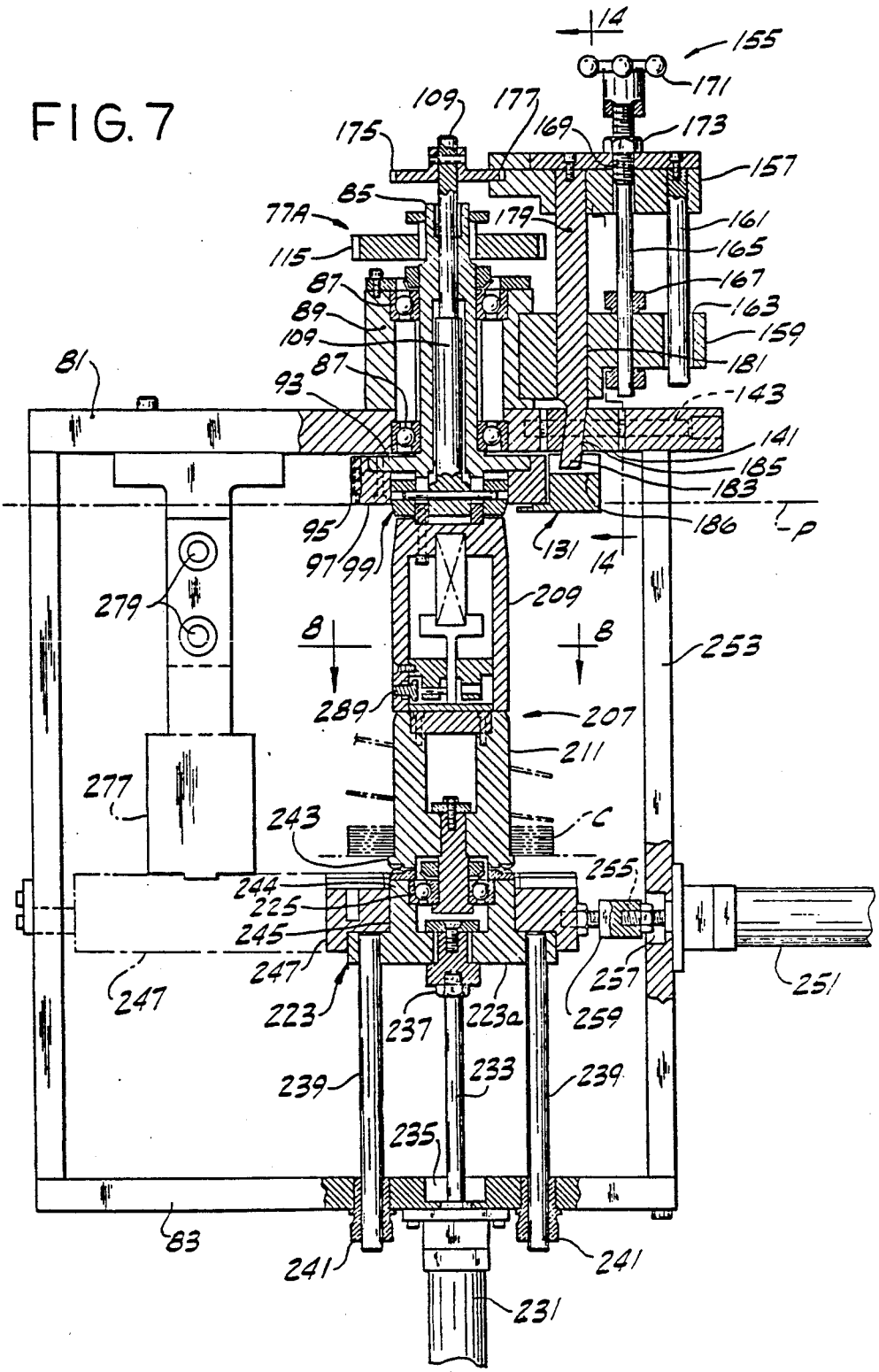
FIG. 7 is a sectional view taken along line 7—7 of FIG. 5.
Figure 17:
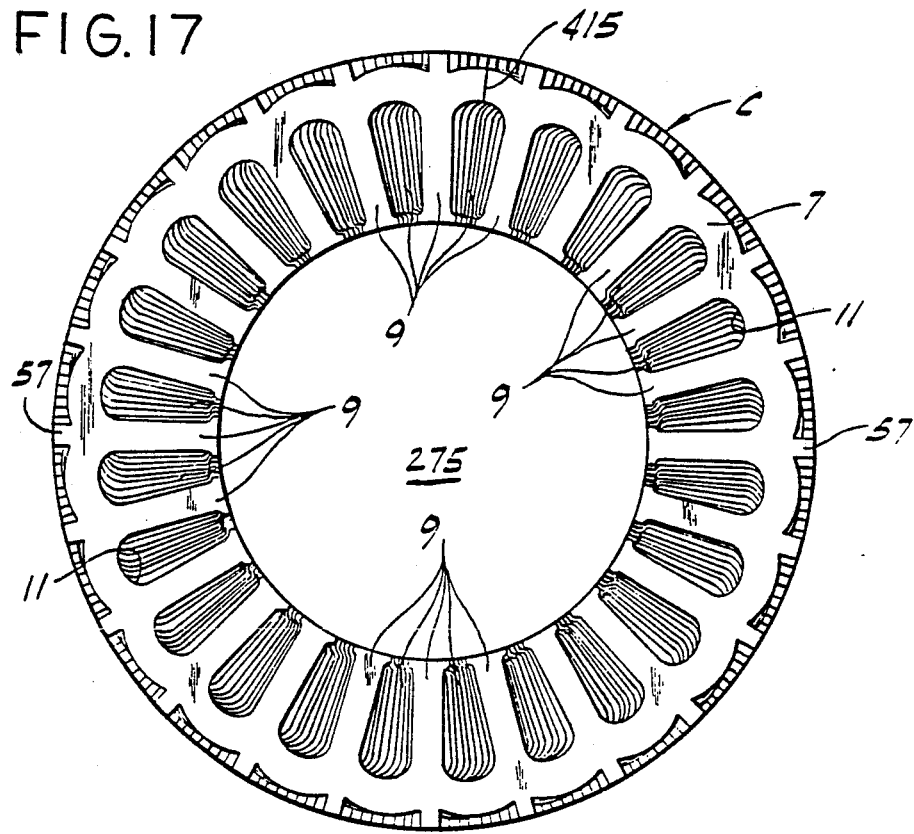
FIG. 17 is an end view of an edgewise wound core formed in accordance with this invention for use in a dynamoelectric machine in a typical as-wound state of the core with teeth and slots of adjacent helical convolutions of the core angularly displaced.

As appears in FIGS. 7 and 9, the helical convolutions accumulate in an axial stack thereof on flange 243 of lower arbor section or core receiver 211 of winder 77A, and the helical convolutions extend in spaced apart relation axially (vertically) generally from rotary cutters 263, 265 down to those helical convolutions already accumulated in the generally axial stack thereof on flange 243, as appears in FIGS. 7, 9 and 15. Cutters 263, 265 are rotated to cut the strip, as will be described, when the accumulated thicknesses of the helical convolutions defining an edgewise wound core C attains the preselected stack height, and those trailing helical convolutions which extend from the cutters down to the already-stacked helical convolutions drop down as indicated by the arrow at the lower left of FIG. 15 to complete the flatwise stacking of the helical convolutions and the formation of an edgewise wound core C. It will be understood that respective ones of edgewise wound cores C will have what is referred to as a yoke section formed by band 7 of the helical convolutions in the axial stack thereof with such yoke section generally defining a circumferential portion of such cores, and strip 5A and teeth 9 extend radially inwardly from the band to form at least in part a bore 275 through the core with slots 11 being disposed between the teeth. At this stage, teeth 9 and lands 57 of adjacent helical convolutions of a core C may be angularly displaced one from another, as illustrated in FIGS. 17 and 18, but the convolutions are easily rotatable one relative to another to align the teeth and slots 11 generally axially between opposite end faces of the core in the course of final operations on the core as is well known to the art.

Upon the cutting of strip 5A by cutters 263, 265 in winder 77A to complete the formation of an edgewise wound core C on flange 243 of core receiver or lower arbor section 211, elevator 223 is moved downwardly thereby to conjointly move the lower arbor section therewith, and upon such conjoint downward movement, core C carried on the lower arbor section engages carriage 247 generally about opening 245 therein, and such core is thereby stripped from the lower arbor section as the latter is moved downwardly to its lowered retracted position, as shown in FIG. 4, below carriage 247. Thus, with a core C so deposited on carriage 247 and with lower arbor section 211 in its retracted position, the carriage is moved from the at-rest position to the advanced position thereof, as shown in solid lines in FIG. 4 and in phantom in FIG. 7, by cylinder 251 to bring the core C to a discharge or displacement position in the path of a means for displacing the core, such as a core ejector 277 or the like for instance. The latter comprises a core pusher slidably movable on guide rods 279 in the frame structure from a retracted position, as illustrated in solid lines in FIG. 4, to a protracted or core displacing position, as illustrated in phantom in FIG. 4, for pushing the core from carriage 247 onto a means for receiving the core and for effecting the movement thereof from the apparatus, such as for instance a roller conveyor 281 or the like sloping downwardly in an apparatus exiting direction. Core pusher 277 is reciprocally movable by means of an air cylinder 283 having its piston rod 285 connected to the core pusher at 287.

When strip 5A is cut upon the formation of an edgewise wound core C from the helical convolutions of the strip, as discussed above, the leading end of the cut helical convolution coils around upper arbor section 209 without interruption. To prevent the trailing end of the cut helical convolution and the oncoming helical convolution from falling from upper arbor section 209 when lower arbor section 211 is separated therefrom, upper arbor section 209 is provided with supporting means comprising a set of pins 289 (see FIGS. 8 and 9) slidable radially with respect to the upper arbor section into and out of openings or holes 290 in the upper arbor section adjacent its lower end. Pins 289 have heads 291 at their inner ends within a chamber in upper arbor section 209, each of these pin heads being shaped on its outwardly facing side to provide a camming surface 293. Pins 289 are biased to slide radially outwardly relative to upper arbor section 209 so that the free ends or free end portions of the pins extend beyond the circumferential surface of the upper arbor section by a set of springs or spring means 295 respectively retained in a spider 297 secured within the upper arbor section by screws 298. At 299 is indicated a cam or camming means for camming pins 289 inwardly to a retracted position wherein their outer or free ends are disposed within holes 290 out of the way of the helical convolutions of strip 5A progressing helically downwardly about the circumferential surface of the upper arbor section. Cam 299 is cup shaped, having a circular bottom 301 and an upwardly extending peripheral wall 303 which is slidable upwardly and downwardly in the chamber within the upper arbor section 209 generally adjacent its lower end. Peripheral wall 303 of cam 299 has notches 305 receiving pins 289 and is beveled at its upper edge to provide a camming surface 307 cooperable with camming surfaces 293 of the pin heads. Cam 299 is secured to the lower end of a plunger 309 vertically slidable in spider 297, the plunger and cam being biased downwardly toward an at-rest position by a compression spring or resilient means 311 reacting from upper end 213 of upper arbor section 209 against a head 313 on the plunger. A plug 315 secured on a shoulder 317 adjacent the upper or free end of lower arbor section 211 is engageable with the bottom of cam 299 when the lower arbor section is raised to hold the cam up in the raised or camming position thereof, as illustrated in FIG. 9, wherein the bottom of the cam is flush with the lower or free end of upper arbor section 209. Cam 299, when it its raised position disposes camming surface 307 thereof in camming engagement with camming surfaces 293 of pins 289 so as to cam or hold the pins in their retracted positions (shown in solid lines in FIGS. 8 and 9) thereby to permit downward progression or transfer of the helical convolutions from upper arbor section 209 to lower arbor section 211. When lower arbor section 211 is pulled down to its lowered retracted position by elevator 223, as previously mentioned, cam 299 is driven downwardly toward its at-rest position by spring 311, and springs 295 bias or resiliently urge pins 289 radially outwardly with respect to upper arbor section 209 so that the free ends of the pins protrude therefrom adjacent its lower end, as shown in phantom in FIGS. 8 and 9, for seating and supporting at least some of the oncoming helical convolutions thereby to prevent them from dropping off the lower end of the upper arbor section until such time as lower arbor section 211 is reassociated in aligned relation therewith to receive the helical convolutions. On raising the lower arbor section to its at-rest position, the free end thereof abuts cam 299 moving it upwardly toward its camming position to effect the retraction of pins 289.

Each of cutters 263, 265 is of short cylindrical form with a helicoidal cutting tooth 317 thereon (see FIG. 16), and the cutters are mounted on the ends of cutter shafts 319, 321 journalled in cutter frame 267, respectively. Shafts 319, 321 and cutters 263, 265 thereon are adapted to be driven through a single revolution for cutting strip 5A passing between the cutters by means of a drive 323 including a single-revolution clutch 325 having its output shaft 327 connected to cutter shaft 321, the latter being geared to cutter shaft 319 at 329. At 331 is indicated a solenoid for activating clutch 325 to drive its output shaft 327 and thereby cutter shafts 319, 321 through a single revolution for a cutting operation. An input shaft 335 of clutch 325 is continuously driven via a right-angle drive 337 having its input 339 driven via a pinion 341 in mesh with gear 115 and its output 343 connected via an angle drive 345 to a chain and sprocket drive 347 connected to clutch input shaft 335.

Solenoid 331 of single-revolution clutch 325 is connected in a control circuit, as shown in FIG. 3, with strip thickness sensor 73 controlling operation of the solenoid to trigger clutch 325 for cutting strip 5A when the accumulated thicknesses of the helical convolutions of the strip which have travelled between cutters 263, 265 is such as to provide the preselected stack height (axial dimension) for an edgewise wound core C. It will be readily understood that the stack height of a core C generally equals the accumulated sum of at least some of the individual convolution thicknesses which, as previously mentioned, varies along the length of the strip. In the control circuit, each signal from strip thickness sensor 73, this signal being related to variations in the strip thickness, is fed as indicated at 349 to a signal conditioning and digital readout device 351 such as a Non Contact Gaging System sold by Kaman Science Corp. of Colorado Springs, Colo. The latter amplifies the signal, and as indicated at 353, feeds a DC signal which is proportional to the strip thickness to a waveform analyzer 355 such as a Data 6000 sold by Data Precision Corp. of Danvers, Mass. The latter functions to generate a digital signal based on the average of a relatively high number of thickness readings at the press 19 (e.g., the average of 330 readings), and this signal is fed as indicated at 357 to a computer 359, such as a model 9816 sold by Hewlett Packard Corp. of Palo Alto, Calif. The latter functions to test the signal for validity, i.e., with respect to a preselected value or norm and the previous reading, sums at least some of the valid signal values (i.e., adds at least some of the valid thickness measurements and divides by a preselected number) to generate a total corresponding to the accumulated thickness of the helical convolutions since the last cut, compares the total or sum to a target value corresponding to the preselected stack height to an edgewise wound core C to be produced, and delivers a cut signal via a line 361 to a programmable controller 363 when the sum reaches the target value. Controller 363, is programmed to hold the signal, until it receives an input via a line 365 from a tooth position sensor or sensing means 367, which may be an infrared light sensor sold by Sick Corp. of Munich, West Germany, adjacent the strip cutters that a portion of band 7 of strip 5A between two adjacent teeth 9 of the strip, i.e., a portion of the band generally in line with a slot 11 of the strip, is between the cutters. This insures that the cut is made between teeth 9, where it will completely sever strip 5A, as distinguished from being made in line with a tooth, where it might not completely sever the strip.

Figure 6:
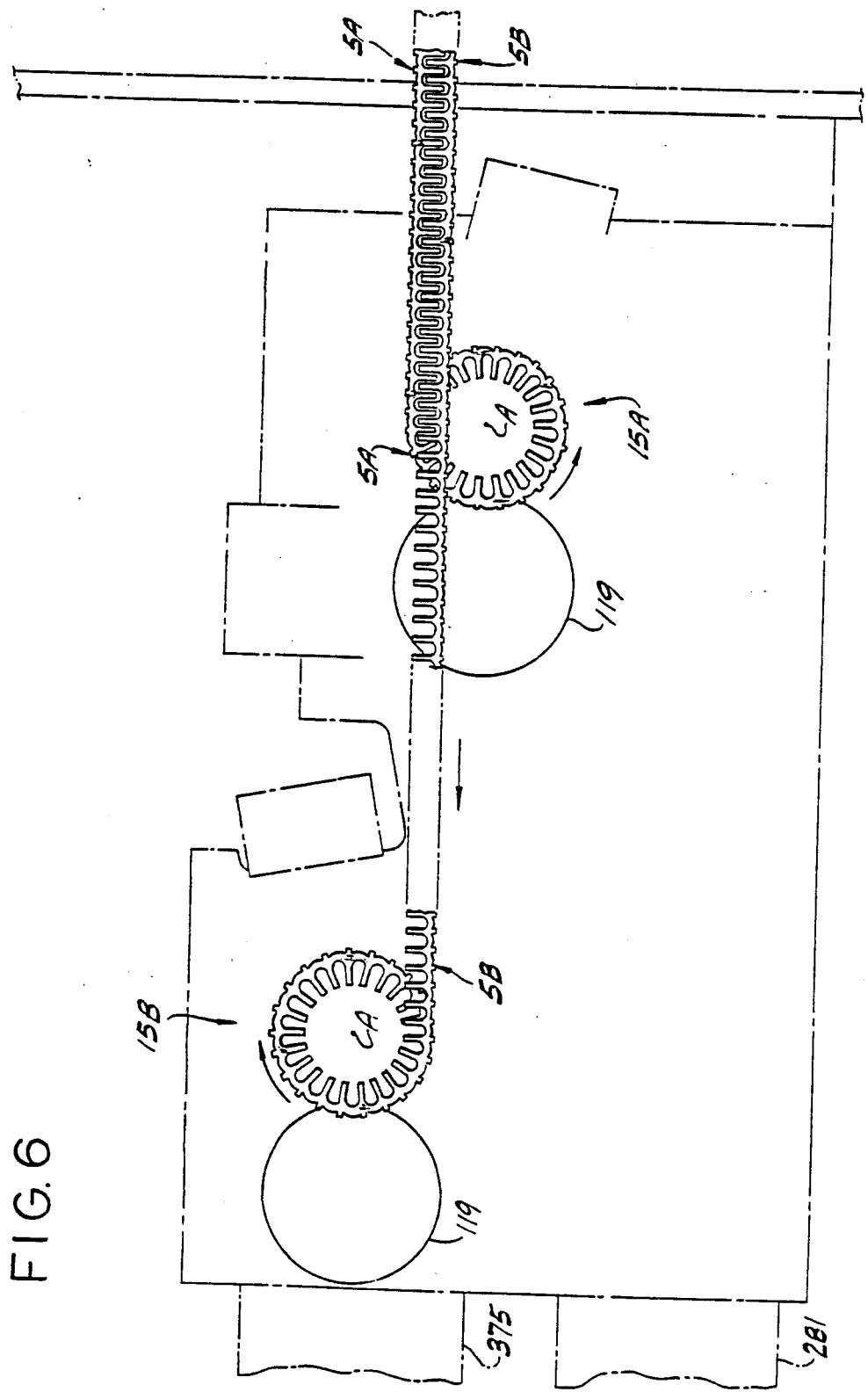
FIG. 6 is a diagrammatic view illustrating the paths of travel of the two strips to the respective winding means therefor and the directions of winding of the continuous strips.

As appears in FIGS. 5 and 6, axis A of winder 77A is offset to the left of the center line of the two strips as viewed in the direction of travel of the strips (downstream direction), and it winds strip 5A (which is the right-hand strip of the two strips 5A, 5B as viewed in downstream direction) in a counterclockwise direction. Winder 77B is situated downstream from winder 77A with its axis A offset to the right of the center line of the strips (again in reference to downstream direction) and winds strip 5B in a clockwise direction. Aside from this difference, and a difference in the core discharge means to be explained hereinafter, winders 77A, 77B are basically identical. Parts of winder 77B corresponding to parts of winder 77A are assigned the same reference numerals. As to the core discharge means of winder 77B, as best seen in FIG. 4, a stationary platform 371 replaces carriage 247 associated with winder 77A. Upon the cutting of strip 5B in winder 77B, elevator 223 of the winder is moved down to move core receiver 211 of the winder down. A formed core C carried on receiver 211 then engages platform 371 being seated around an opening 373 in the platform and is stripped from receiver 211 as the latter moves down to its retracted position wherein its upper or free end is below the platform. Thus, the core is placed on platform 371, and with core receiver 211 clear of the platform, the core is displaced or pushed from the platform by a core pusher 277 (corresponding to that of winder 77A and similarly operated by an air cylinder 283) and onto a second roller conveyor 375 sloping downwardly in exit direction for core discharge.

Winder 77B is driven via chain and sprocket drive 193, speed changer 185, chain and sprocket drive 199, right angle drive 195 and chain and sprocket drive 203, the latter including an idler sprocket 377 on a pedestal 379 on top plate 81 and a sprocket 381 on spindle 85 of winder 77B. Speed changer 185 is under control of the looped portion 17 in strips 5A, 5B for increasing the continuous rate at which the strips are moved by winder 77A, 77B relative to the intermittent rate at which the strips are fed out of press 19 into the looped portion upon increases in the size of the looped portion to an upper limit and for decreasing the continuous rate at which the strips are moved by the winders relative to the intermittent rate at which the strips are fed out of the press into the looped portion upon decreases in the size of the looped portion to a lower limit. The increase and decrease of the winding rate of strips 5A, 5B, i.e., the variable continuous speed of winders 77A, 77B, is effected by controlling speed changer 185 to increase its output speed on increase in the size of looped portion 17 to an upper limit determined by an upper limit sensor 383 and to decrease its output speed on decrease in the size of the looped portion to a lower limit determined by a lower limit sensor 385. These sensors are interconnected as indicated at 387 and 389 in FIG. 1A with a control 391 for a speed changer motor 393 connected by a chain and sprocket drive 395 (see FIG. 5) to speed changer shaft 191. The system is such that when the upper sensor 383 senses increases in the size of the looped portion 17 to the upper limit, it transmits a signal to a control 391 for motor 393 to effect operation of motor 393 for driving shaft 191 to increase the speed of the changer output shaft 189 thereby to increase the speed of winders 77A, 77B. And when the lower sensor 385 senses decreases in the size of looped portion 17 to the lower limit, it transmits a signal to control 391 to effect deenergization of the motor 393 thereby to decrease the speed of the winders. With motor 393 deenergized, the size of loop 17 increases until sensed by upper sensor 383 thereby to reinitiate the system for effectively decreasing the loop size, as previously discussed; however, to accomplish this type of control, it is desirable that the intermittent rate at which press 19 is operated be at least slightly greater than the normal variable rate at which winders 77A, 77B are operated. Sensors 383 and 385 may be induction proximity sensors, activated by proximity thereto of strips 5A and 5B in the loop 17 of a type well known to the art sold by Veeder Root Co. of Hartford, Conn. Albeit not shown herein, it is believed that when lower sensor 385 senses the decrease in size of loop 17 to the lower limit thereof, the lower sensor may signal controller 397 to effect the operation of motor 93 in the opposite direction to decrease the speed of the changer output shaft thereby to decrease the speed of winders 77A, 77B within the scope of the invention so as to meet at least some of the objects thereof.

Air cylinders 231, 283 and 251 for elevators 233 and core ejectors 277 of winders 77A, 77B and carriage 247 of winder 77A are shown in FIG. 3 are connected in a pneumatic circuit including a solenoid valve for 399 controlling cylinders 231, a solenoid valve 401 for controlling cylinders 283, and a solenoid valve 403 for controlling cylinder 251. Operation of these valves is controlled by programmer 363. Programmer 363 is interconnected with solenoid valves 399, 401 and 403 and acts in response to the cut signal (which results in cutting of the strips thereby to complete the formation of an edgewise wound core C as previously discussed) to actuate elevator cylinders 231 for lowering of core receivers 211 and stripping the formed cores therefrom (leaving the core formed in winder 77A on carriage 247 and the core formed in winder 77B on platform 371), followed by actuation of cylinder 251 to drive carriage 247 carrying the core formed in winder 77A to its advanced position (see FIG. 5) in front of core ejector 277 of winder 77A, followed by action of the ejector cylinders 283 to drive core ejectors 277 forwardly to push the cores onto conveyors 281, 283, and then followed by return actuation of the cylinders to return the core ejectors and carriage to their retracted positions and the elevators to their raised position.

In order to set up the apparatus for the continuous formation of edgewise wound cores C, strip stock 3 is unwound from supply 13 thereof, entrained between feed rolls 41, and between press head 31 and die 25, and press 19 is placed in operation or jogged with accompanying intermittent forward feed of the strip stock by the feed rolls through the press and the lancing of the strip stock in the press into strips 5A, 5B. Operation of press 19 is continued until a sufficient length of strip 5B has been generated to reach to winder 77B, and the press is then stopped. This also generates more than a sufficient length of strip 5A to reach to winder 77A and the excess length of strip 5A is manually cut off.

With press 19 and winders 77A, 77B stopped, the leading end of strip 5A is temporarily attached to rive wheel 95 of winder 77A, as illustrated in FIG. 9, by means of a pin 409 removably mounted in a hole 411 as by means of set screw indicated at 413 in the friction drive wheel and extending downwardly therefrom into a hole made in the leading end of band portion 7 of the strip. Pin 409 extends only slightly from bottom surface 97 of wheel 95 so that it does not extend beyond strip 5A. The leading end of strip 5B is similarly temporarily attached to wheel 95 of winder 77B. Then, press 19 is jogged to jog winders 77A, 77B and thereby draw strips 5A, 5B around through bending guides 131 of the winders to the point where the leading end of each strip and the respective pins 409 are past the respective pinch wheels 119. To complete the setup of the apparatus, press 19 is again stopped to stop both winders, and pins 409 are removed to free strips 5A, 5B for the downward helical progression onto the respective split arbors 207 of the helical convolutions into which the strips are formed. It is contemplated that the above discussed set up of the apparatus may be effected for each roll of stock 3 introduced to the apparatus, and it is also contemplated that means, such as a laser welder or the like for instance, may be utilized in conjunction with such apparatus to interconnect the trailing end of a roll of stock with a leading end of a successive roll of stock so as to continually supply stock to the apparatus thereby to obviate successive setups thereof to accept each roll of stock, as mentioned above, within the scope of the invention so as to meet at least some of the objects thereof.

With loop 17 formed in strips 5A, 5B, operation of press 19 is resumed, and the apparatus may be thereafter continuously operated to effect the continuous formation of edgewise wound cores C, as discussed hereinafter. Strip stock 3 is intermittently fed by feed rolls 41 in increments equal to one-quarter the length of a helical convolution into which each strip is edgewise wound; however, it is contemplated that other feed increments may be employed within the scope of the invention so as to meet at least some of the objects thereof. In its dwell intervals between the feed intervals, strip stock 3 is punched or lanced as has been described into strips 5A, 5B. These two strips, divided one from the other by reason of the punching operation, but still in interdigitated relation, feed intermittently from die 25 out from under press head 31 and punches 29 into looped portion 17 of the strips.

With the leading end of strips 5A, 5B having been drawn through bending guides 131 of winders 77A, 77B and past pinch wheels 119 thereof and with pins 409 removed, the aforementioned setup of the apparatus is complete, and the apparatus may be thereafter continuously operated to effect the continuous formation of edgewise wound cores C. Upon the continuous operation of the apparatus, winders 77A, 77B are conjointly driven continuously off press 19 to effect continuous edgewise winding of strips 5A, 5B. The drive for both winders is from press shaft 35, which runs continuously, via speed changer 185. The looped portion 17 in strips 5A, 5B is such as to enable continuous feed of the strips from the looped portion to winders 77A, 77B between intermittent successive feed cycles of strip stock 3 and during such intermittent feed cycles for the continuous winding of the strips. Upon an increase in the size of looped portion 17 as sensed by upper sensor 383, the upper sensor transmits a signal to control 391 for speed change motor 393 to effect operation of this motor to increase the speed of output shaft 189 of speed changer 185 thereby increasing the speed of both winders 77A, 77B and hence the continuous rate at which strips 5A, 5B are wound relative to the intermittent rate at which such strips are fed from press 19 into the looped portion in order to reduce the size of the looped portion from the upper limit as determined by upper sensor 383. Upon decreases in the size of looped portion 17 as sensed by the lower sensor 385, the lower sensor transmits a signal to control 391 for speed change motor 393 to effect operation of this motor to decrease the speed of output shaft 189 of speed changer 185 thereby decreasing the speed of winders 77A, 77B and hence the continuous rate at which strips 5A, 5B are wound relative to the intermittent rate at which such strips are fed from press 19 into the looped portion in order to increase the size of the looped portion from the lower limit determined by the lower sensor. Thus, looped portion 17 is maintained within the limits determined by sensors 383, 385 without becoming too small or too large.

Each of the strips 5A, 5B is continuously wound edgewise into a plurality of generally helical convolutions thereof in the respective winders 77A, 77B by being drawn through the respective bending guides 131 of the winders by reason of band portion 7 of the strip being pinched or grippingly engaged between the respective drive wheel 95 and pinch wheel 119 of the winders, both these wheels being continuously driven. Wheel 119 applies pressure to band portion 7 of the strip to hold it flatwise against bottom surface 97 of drive wheel 95, and the frictional engagement between the opposite faces of the strip generally at band portion 7 thereof with drive wheel 95 and pinch wheel 119 is such as to effect the drawing of the strip through bending guide 131. As the strip is drawn through bending guide 131, its band portion 7 is constrained flatwise at 139 between flange 133 of the bending guide and bottom surface 97 of wheel 95, i.e., the strip is confined at both opposite faces thereof between 133 and 97, to prevent buckling. Also, the strip is confined at its opposite edges, more particularly at the outer opposite edge on lands 57 by bending edge 137 of the bending guide and at the inner opposite edge at the tips of teeth 9 by the surface of conic portion 103 of mandrel 99. In being drawn through bending guide 131, the strip is bent edgewise to form the continuous helical convolutions, each having a diameter corresponding to the diameter of the conic surface on mandrel 99 in plane P, as it reaches the end of portion 137b of the bending edge 137 of the bending guide. As each helical convolution exits from bending guide 131, it is released from its stated confinement at its outer edge and, when so released, may tend to spring back outwardly to a larger diameter. The spring-back is measured, e.g., when the winding is stopped to remove the pins 409 during the above discussed setup of the apparatus, and each mandrel 99 and each bending guide 131 are adjusted by turning the respective knob 171 to make the effective mandrel diameter, i.e., the diameter of conic section 103 of the mandrel in plane P, correspond to the final internal diameter (after spring-back) desired for the cores C. Bending guide 131 is also adjusted to space bending edge 137b thereof from the conic surface 103 of the mandrel in plane P a distance corresponding to the overall width of the strip, thereby to achieve the edgewise confinement of the strip. The net effect of this is that each strip is wound into helical convolutions which have a preliminary diameter (internal or external) less than the final diameter (internal or external) by the amount of spring-back. Then upon release from edgewise confinement, each convolution springs out (i.e., expands) to the final or preselected diameter greater than the preliminary diameter.

Generally, the adjustment for spring-back of each strip is made during the setup of the apparatus, as previously mentioned at the start of winding strips 5A, 5B generated from each coil 13 of strip stock 3, and it may also be made from time-to-time during the continuous operation of the apparatus as conditions may require. Further, and as also previously mentioned, it will be understood that when the end of one coil 13 is reached, the leading end of the next coil may be attached thereto by suitable means for continuing the operation without a setup of the apparatus, and the spring-back of material from such next coil generally will be initially measured and the necessary mandrel and guide adjustment made.

In each of the winders 77A, 77B, the helical convolutions of the respective strip edgewise wound thereby are released from confinement as they travel around the respective mandrel 99 and exit from the respective pressing zone 130 (i.e., from between wheels 95, 119). The progressively formed helical convolutions then progress helically downwardly away from mandrel 99 and away from bottom surface 97 of wheel 95 to encircle split arbor 207 and accumulate in an axial stack on flange 243 of lower arbor section 211, as appears to advantage in FIG. 9. As the helical convolutions pass from between wheels 95, 119 and travels helically downwardly off mandrel 99, the helical convolutions pass between rotary cutters 263, 265 (see FIG. 15). Computer 359 analyzes the thickness measurements made in press 19 by thickness sensor 73, as previously discussed, and when such analyzed thickness measurements attain a value correlative with the preselected stack height for an edgewise wound core C, the cut signal is transmitted via line 361 to controller 363. Under control of sensor 367, controller 363 delays the energization of cutter solenoid 331, if need be, until a portion of band portion 7 of the strip between two adjacent teeth 9 of the strip is between cutters 263, 265. Then cutter solenoid 331 is energized to rotate cutters 263, 265 and cut the strip between teeth so as to completely sever it. The cut line is as indicated at 415 in FIGS. 17 and 19. When the strip is cut, those convolutions below the cut which extend from the cutter means down to the convolutions accumulated in the axial stack thereof on flange 243 fall down on top of the stack (pins 289 of the upper arbor section 209 being retracted at this point in time) to complete the production or formation of an edgewise wound core C. In each winder, the completed helix or core bears on the flange 243 of the core receiver 211 (which is in raised position), the core surrounding the receiver.

The signal to the cutter solenoid is also transmitted via another output of controller 363 through line 407 to the pneumatic circuit (see FIG. 3). Controller 363 then functions first to actuate valve 399 to actuate the elevator cylinders 231 to retract their piston rods and thereby lower elevators 233 and core receivers 211 thereon. As elevator 233 and core receiver 211 of winder 77A go down, core C on this core receiver is deposited onto carriage 247 (which is in its retracted position) and thereby stripped from the core receiver. As elevator 233 and core receiver 211 of winder 77B go down, the core C on this core receiver is deposited onto platform 371 and thereby stripped from the core receiver.

Figure 8:
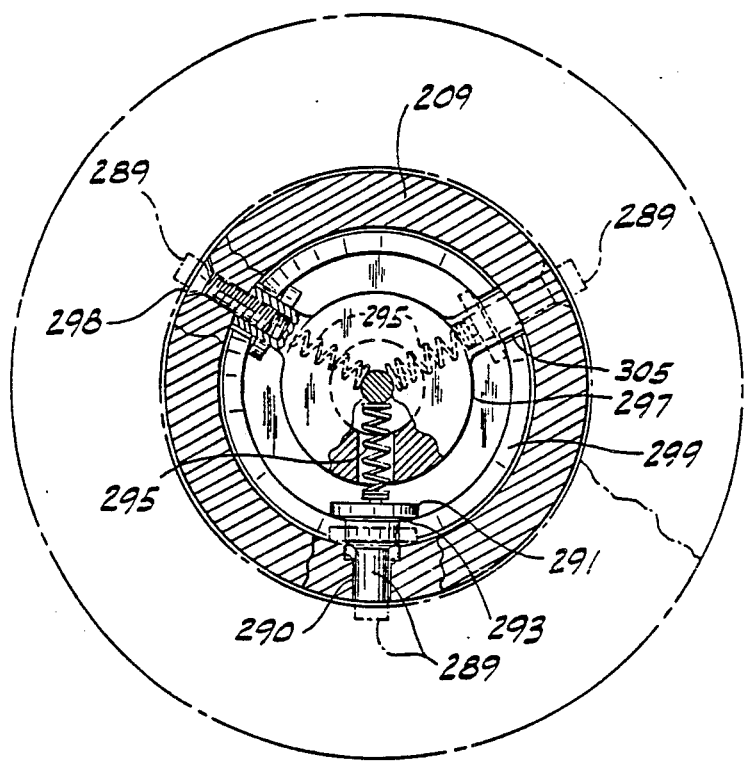
FIG. 8 is a sectional view taken along line 8—8 of FIG. 7.

As each core receiver 211 goes down and its upper end disengages from the respective cam 299, the latter is released to move down under the bias of spring 311, with the result that pins 289 are projected to extend radially outwardly from the upper arbor section 209 adjacent its lower end as shown in phantom in FIGS. 8 and 9 for supporting at least some of the oncoming helical convolutions and preventing them from dropping off the lower end of the upper arbor section until the receiver is moved back up to receive the convolutions.

The controller 363 also functions through still another output thereof and a line 407a to actuate valve 403 to actuate carriage cylinder 251 to extend its piston rod and move carriage 247 to its advanced position shown in FIG. 5 thereby bringing the core C on the carriage in front of ejector or pusher 277 of winder 77A. Then the controller 363 functions through another of its outputs and a line 407b to actuate valve 401 to actuate cylinders 283 to retract their piston rods and drive ejectors or pushers 277 through a working stroke to push the first core C off carriage 247 onto conveyor 375. Then the controller functions to actuate the valves and cylinders in the reverse sequence to return the pushers to their retracted position, the carriage to its retracted position, and the elevators and core to their raised position. To complete the operation of the apparatus, when the elevators and receivers are raised, cams 299 are actuated to their camming positions by the receivers thereby to return pins 289 to their retracted position, clearing each upper arbor section 209 for travel or translation of the helical convolutions accumulated thereon into seating engagement with flange 243 on the respective receiver 211.

Figure 21:
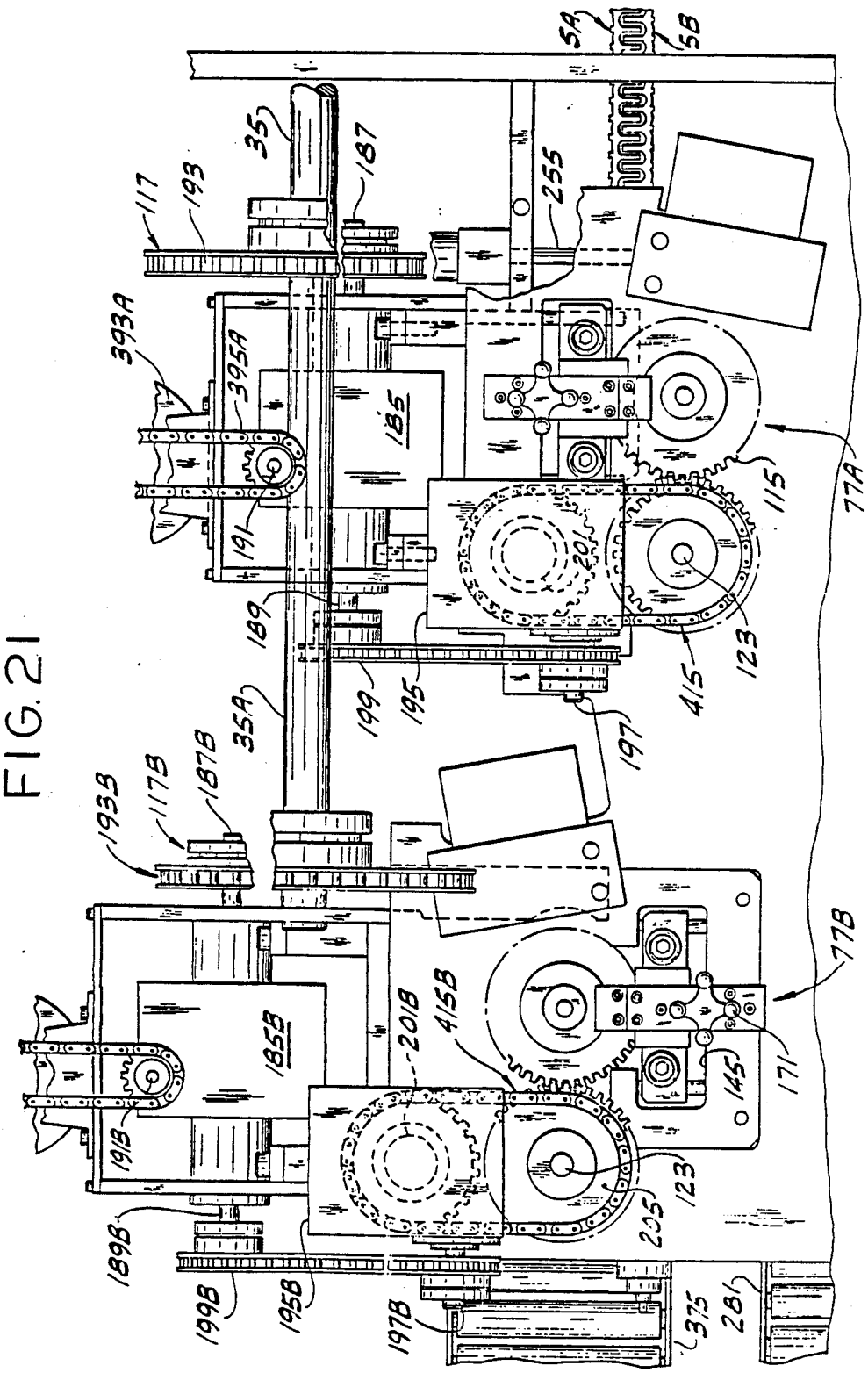
FIG. 21 is a partial plan view similar to FIG. 5 showing an alternative apparatus for continuously forming edgewise wound cores in one form of the invention and illustrating principles which may be practiced in an alternative method for continuously forming edgewise wound cores also in one form of the invention.
Figure 22:
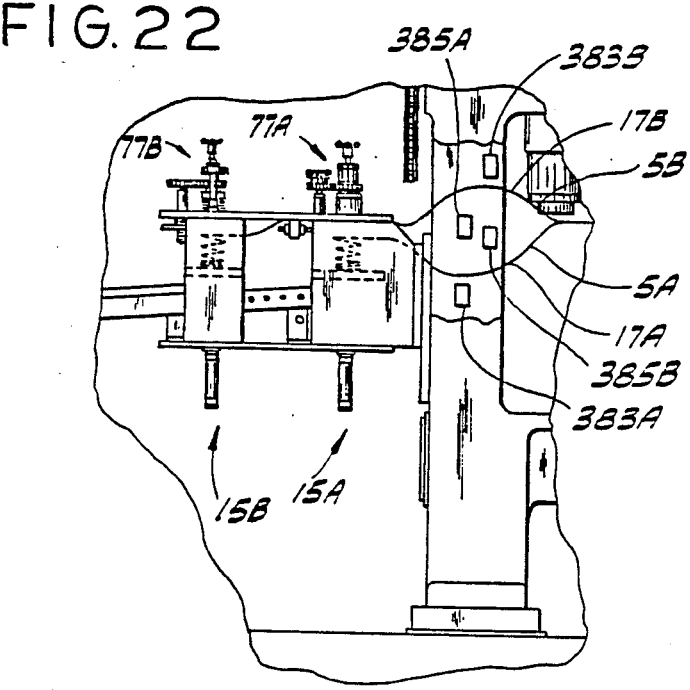
FIG. 22 is a partial elevational view of the alternative apparatus of FIG. 21 illustrating separate winding means thereof.
Figure 23:
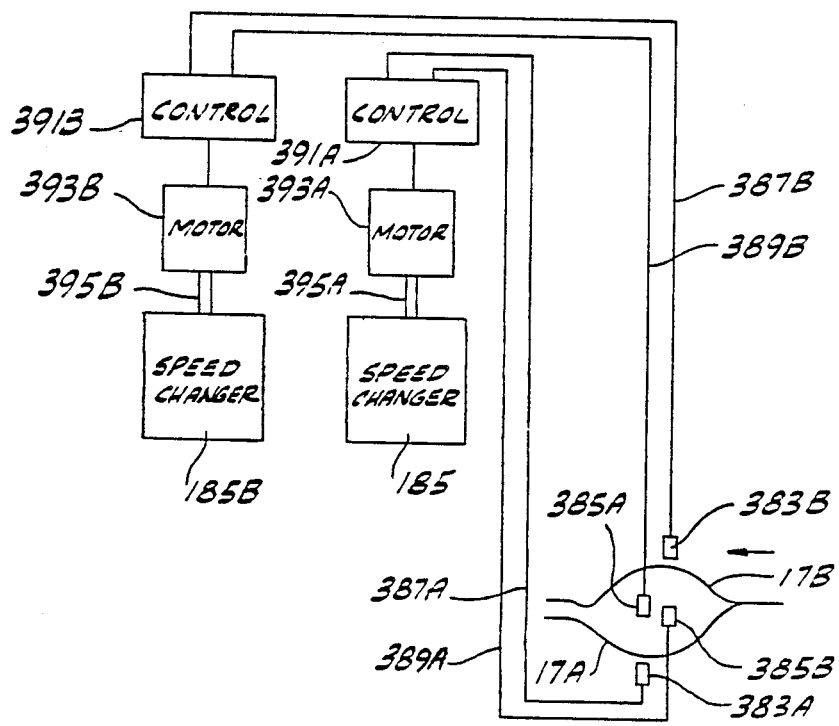
FIG. 23 is a schematic diagram showing separate speed controls for the separate winding means of the alternative apparatus and a circuit therefor including certain sensors illustrated in FIG. 22.

Referring now to FIGS. 21–23, there is shown an alternative apparatus for continuously forming edgewise wound cores in one form of the invention which may be utilized in an alternative method for continuously forming edgewise wound cores in one form of the invention, and the alternative apparatus has generally the same component parts functioning generally in the same manner as those of the previously described apparatus with the exceptions discussed hereinafter. While the alternative apparatus and alternative method meet at least some of the objects set out herein, it is believed that such alternative apparatus and method may have additional objects and advantageous features which will be in part apparent and in part pointed out in the following discussion.

In FIGS. 21–23, it may be noted that the speed of each winder 77A, 77B of the alternative apparatus is individually controlled instead of being under common control. For this purpose, the drive via 203 from winder 77A to winder 77B is omitted. Pinch wheel shaft 123 of winder 77A is driven from shaft 201 via a chain and sprocket drive indicated at 415. Winder 77B has its own drive 117B from an extension 35A of press shaft 35, similar to drive 117 for winder 77A, including a speed changer 185B corresponding to speed changer 185, having an input shaft 187B, an output shaft 189B, and a speed change shaft 191B. Input shaft 187B is adapted to be constantly driven at a speed related to the press shaft speed by a chain and sprocket drive 193B from press shaft extension 35A. At 195B is indicated a right angle drive corresponding to 195 having a horizontal input shaft 197B driven by a chain and sprocket drive 199B from speed changer output shaft 189B and a downwardly extending output shaft 201B. The latter is connected to drive pinch wheel shaft 123 of winder 77B via a chain and sprocket drive 415B.

Referring to FIG. 22, it will be observed that instead of operating with a single loop comprising a loop of strip 5A and a loop of strip 5B on passage of the strips from die 25, operation proceeds with an individual loop 17A of strip 5A and an individual loop 17B of strip 5B. One of these is directed upwardly and the other downwardly, and as shown, loop 17A is the one directed downwardly and loop 17B is the one directed upwardly. A pair of sensors 383A, 385A are provided for loop 17A, and another pair of sensors 383B, 385B are provided for loop 17B. Speed changer 185 of winder 77A is under control of sensors 383A, 385A, and speed changer 185B of winder 77B is under control of sensors 383B, 385B. Sensors 383A, 385A are interconnected as indicated at 387A, 389A in FIG. 23 with control 391A for reversible speed changer motor 393A connected by chain and sprocket drive 395A (FIG. 21) to speed changer shaft 191 of winder 77A. Sensors 383B, 385B are interconnected as indicated at 387B, 389B in FIG. 23 with control 391B for reversible speed changer motor 393B connected by chain and sprocket drive 395B (FIG. 21) to speed changer shaft 191B of winder 77B. The system is such that when sensor 383A senses an increase in the size of loop 17A to the upper limit of the size of this loop, it transmits a signal to a control 391A for motor 393A to effect operation of motor 393A in the direction for driving shaft 191B to increase the speed of changer output shaft 189B thereby to increase the speed of winder 77B, which decreases the size of the loop. When sensor 385A senses a decrease in the size of the loop 17A to the lower limit of the size of the loop, it transmits a signal to control 391A to effect the deenergization of motor 393 thereby to decrease the speed of winder 77A which effects an increase in the size of the loop. Similarly, when sensor 383B senses an increase in the size of loop 17B to the upper limit, it transmits a signal to control 391B for motor 393B to effect operation of motor 393B in the direction for driving shaft 191B to increase the speed of changer output shaft 189B thereby to increase the speed of winder 77B which effects a decrease in the size of the loop. When sensor 385B senses a decrease in the size of loop 17B to the lower limit, it transmits a signal to control 391B to effect the deenergization of motor 393B thereby to decrease the speed of winder 77B which effects an increase in the size of the loop.

In FIGS. 24–31, there is shown an alternative lanced strip 501 which is adapted to be edgewise wound into an alternative core 503, and the alternative lanced strip 501 and core 503 have generally the same constructions and are formed generally in the same manner as the previously discussed lanced strips 5A, 5B and core C with the exceptions discussed hereinafter.

Figures 24, 25:
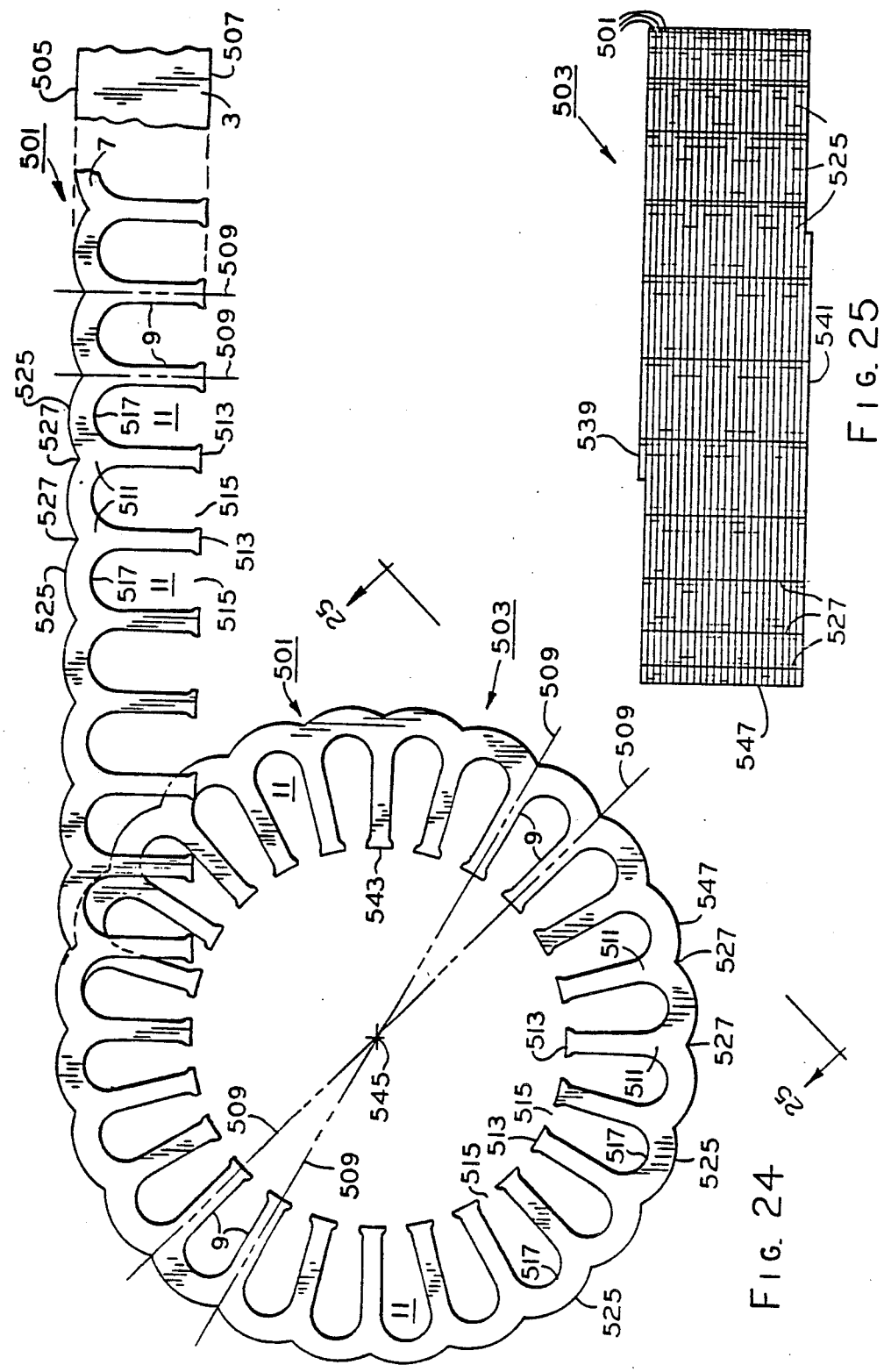
FIG. 24 is a top elevational view illustrating an edgewise wound core, and a lanced strip from which the core is formed is shown extending therefrom to illustrate the construction of the lanced strip prior to the edgewise winding thereof into the core.
FIG. 25 is a partial side elevational view of the core of FIG. 24.

More particularly, lanced strip 501 may be formed from strip stock 3 of the generally thin ferromagnetic material as illustrated in FIGS. 24 and 26 with dotted lines 505, 507 representing a pair of opposite edges of the strip stock. While only a single strip of strip stock 3 is illustrated herein for purposes of simplicity of disclosure, it is contemplated that a plurality of lanced strips 501 may be simultaneously and progressively formed from strip stock 3 as discussed above. It is contemplated that the ferromagnetic material of lanced strip 501 may be any suitable grade steel having the desired magnetic, electrical and physical properties and that various thickness (not shown) of the lanced strip suitable to accommodate the edgewise winding thereof may be employed within the scope of the invention so as to meet at least some of the objects thereof.

Yoke section 7 of lanced strip 501 extends generally lengthwise thereof, and teeth 9 are arranged so as to extend generally laterally or perpendicularly with respect to the yoke section generally in coplanar relation therewith. To effect this relationship between yoke section 7 and teeth 9, pitch axes 509 of the teeth are predeterminately arranged in parallel and equidistantly spaced relation with each other, and the teeth pitch axes are also illustrated herein as being generally perpendicular to opposite edges 505, 507 of strip stock 3. Teeth 9 are generally aligned about pitch axes 509, and the teeth include a plurality of root portions or sections 511 integral with yoke section 7 and a plurality of tips or tip sections 513 which are provided on the free end of the teeth opposite the root portions and equidistantly spaced therefrom, respectively. Slots 11 are disposed at least in part between adjacent ones of teeth 9, and the slots include a plurality of open ends or passages 515 which extend generally between tips 513 of the adjacent ones of the teeth, respectively. While teeth 9 and slots 11 of lanced strip 501 are shown herein for purposes of disclosure, it is contemplated that other teeth and slots having various different configurations may be employed within the scope of the invention so as to meet at least some of the objects thereof.

A plurality of arcuate inner edges 517 on yoke section 7 is defined by a radius 519 having a center point 521 on a central axis 523 spaced equidistantly between pitch axes 509 of adjacent teeth 9, and each such inner edge extends between root portions 511 of the adjacent teeth thereby to define a closed end of respective ones of slots 11 generally opposite open end 515 thereof. Thus, it may be noted that the curvatures of arcuate inner edges 515 generated by radius 519 about center point 521 are smoothly joined with the opposed side edges of teeth 9 at root portions 511 thereof so that closed ends of slots 11 define a "round bottom" or edge construction for such slots. A plurality of arcuate outer edges or scallops 525 are provided on lanced strip 501 generally opposite arcuate inner edges 517 thereof, and adjacent ones of the arcuate outer edges intersect with each other, as indicated at 527. Intersections 527 between adjacent arcuate outer edges 525 are coincidental or intersect with pitch axes 509 of teeth 9, respectively. Each arcuate outer edge 525 is defined or generated by another radius 529 predeterminately greater than radius 519 of arcuate inner edges 517 and having the same center point 521 as radius 519, and the crowns of the arcuate outer edges may be generally tangent to opposite edge 505 of strip stock 3, respectively.

A plurality of generally uniform arcuate segments 531 of yoke section 7 are disposed generally between the sets of arcuate inner and outer edges 517, 525 thereof, respectively, and the arcuate length 533 of each uniform arcuate segment is defined by a pair of imaginary planes 535, 537 extending between center point 521 of radii 519, 529 and the intersections 527 of adjacent ones of arcuate outer edges 525, the imaginary planes extending, of course, generally perpendicularly with respect to the plane of lanced strip 501, respectively. It may be noted that segments 531 provided in yoke section 7 of lanced strip 501 in the manner discussed above have a generally uniform cross-sectional area throughout the arcuate length 533 of such segments which, as may be further noted, is the maximum dimension available with respect to the aforementioned "round bottom" construction of slots 11 and pitch axes 509 of teeth 9. Thus, the provision of arcuate segments 531 with a uniform cross-sectional area of maximum arcuate length 533 on lanced strip 501 not only accommodates the "round bottom" construction of slots 11 but also enhances edgewise winding of the lanced strip into core 503 which requires small unit deformations in yoke section 7 thereof by stressing the arcuate segments both in tension and compression over their uniform cross-sectional areas along the arcuate lengths 533 of the segments. The edgewise winding of lanced strip 501 into core 503 is generally the same as that previously discussed herein with respect to lanced strips 5A, 5B and core C, and as previously mentioned, round bottom slots 11 are preferred to enhance the injection or placement thereinto of the round magnet wire utilized in the coils of windings (not shown) for core 503.

Figure 28:
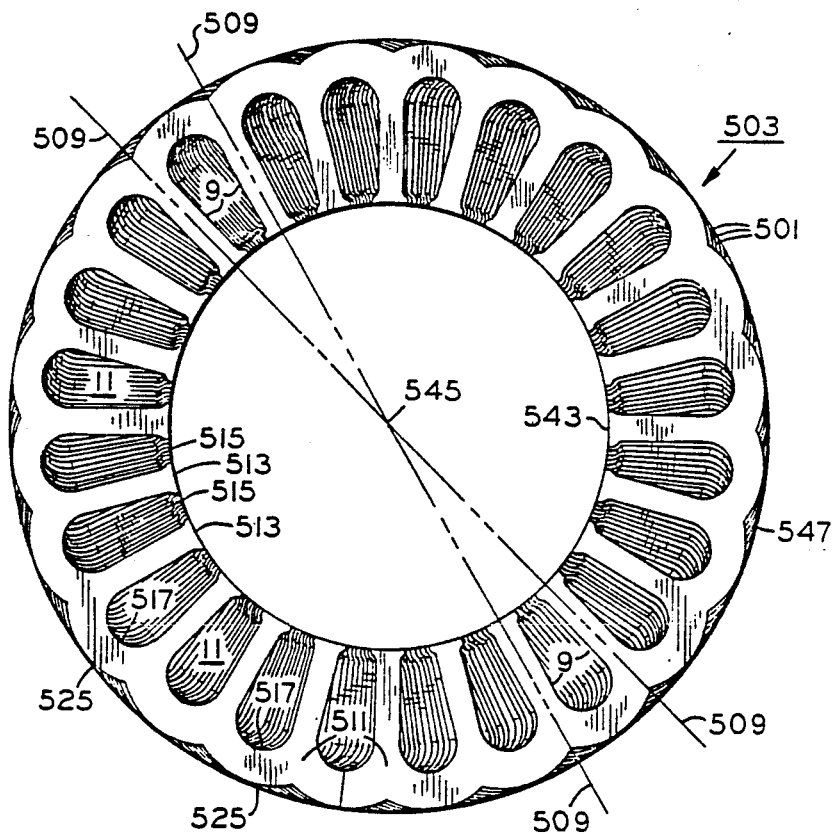
FIG. 28 is a top elevational view of the edgewise wound core of FIG. 24 illustrating an initial stage of the formation thereof.
Figure 29:
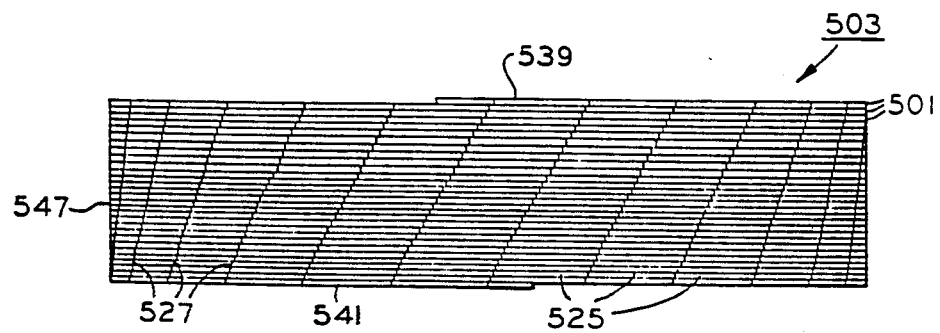
FIG. 29 is a side elevational view of the edgewise wound core of FIG. 28 in its initial stage of formation.

In FIGS. 28 and 29, core 503 is illustrated as it is initially edgewise wound. In this initial stage of the formation of core 503, helical convolutions of the edgewise and helically wound lanced strip 501 are generally flatwise stacked or received upon each other, and the component parts of yoke section 7 and teeth 9 on the wound lanced strip may be somewhat angularly displaced from each other as shown. However, the helical convolutions of wound lanced strip 501 are easily rotatable or adjustable relative to each other, and such relative rotation or adjustment may be effected in various different manners well known to the art on suitable means also well known to the art, such as for instance an aligning mandrel or the like (not shown), thereby to effect the alignment of the component parts of the wound lanced strip generally in axial row formation across core 503, as illustrated in FIGS. 24 and 25

Upon the alignment of core 503 as discussed above, opposite end portions on wound lanced strip 501 define a pair of axially spaced apart opposite end faces 539, 541 of the core. Thus, the components of yoke section 7 and teeth 9 on wound lanced strip 501 are arranged generally in axial row formation across core 503 between opposite end faces 539, 541 thereof, and the teeth extend generally radially about pitch axes 509 thereof. In core 503, the pitch of teeth 9 is a function of the diameter of the core, as is well known to the art. Tips 513 of teeth 9 are also aligned therewith between opposite end faces 539, 541 of core 503, and the tooth tips define in part a bore 543 which extends generally coaxially about a centerline axis 545 of the core intersecting with the opposite end faces thereof, respectively. Of course, since yoke section 7 and teeth 9 of wound lanced strip 501 are axially aligned between opposite end faces 539, 541 of core 503, slots 11 including open and closed ends 515, 517 thereof defined between the yoke section and the teeth are also aligned in axial row formations across the core intersecting with the opposite end faces thereof, and the open ends of the slots between tips 513 of adjacent ones of the teeth also communicate or intersect with bore 543 of the core, respectively. Arcuate outer edges 525 on wound lanced strip 501 define a circumferential surface 547 about core 503, and the arcuate outer edges as well as intersections 527 between adjacent ones thereof are aligned in axial row formation across the core intersecting with opposite end faces 539, 541 thereof, respectively. It may be noted that the lines of intersections 527 extending generally transversely across core 503 between adjacent ones of arcuate outer edges 525 on wound lanced strip 501 are coincidental or intersect with pitch axes 509 of teeth 9 in the generally radial disposition or radially extending positions thereof in the core, and the inner and outer edges 517, 525 of each set thereof are also disposed in radial alignment in the core, respectively.

Arcuate segments 531 of yoke section 7 on wound lanced strip 501 are likewise arranged in axial row formation across core 503 between opposite end faces 539, 541 thereof, and as previously mentioned, the segments are deformed, both in tension and compression, generally across the uniform cross-sectional area along the arcuate length 533 thereof in response to the edgewise and helical winding of the wound lanced strip upon the formation of the core, respectively. Since the uniform cross-sectional area of arcuate segments 531 is effective along a maximum arcuate length 533 thereof between root portions 511 of adjacent ones of teeth 9, it is believed that the force required to effect unit deformation of the uniform arcuate segments is less than that which may be required to effect a similar deformation of a segment having a nonuniform cross-sectional area along its length. The aforementioned unit deformation or straining of arcuate segments 531 is believed to occur in the direction of the arcuate length 533 thereof, as indicated for instance by dotted strain lines 549 in FIG. 27 for purposes of illustration, and it is believed that such unit deformation occurs generally between root portions 511 of adjacent ones of teeth 9.

In FIGS. 30 and 31, here is shown another alternative lanced strip 561 which is also adapted to be formed into core 503, and the alternative lanced strip has generally the same construction and is formed generally in the same manner as the previously discussed lanced strips 5A, 5B, 501 with the exceptions discussed hereinafter.

As shown in FIG. 30, yoke section 7 of lanced strip 561 has a plurality of sets of opposite generally arcuate inner and outer edges 563, 565 thereon which respectively include a pair of opposite flat portions or edges 567, 569 having a preselected length as indicated at 571. Each of inner edges 563 include a pair of arcuate edge portions or sections 573, 573a which are generated by a pair of equal radii 575, 575a about a pair of centerpoints 577, 577a, and the centerpoints are spaced apart by preselected length 571 of flat portions 567, 569 on opposite sides of centerline axis 523 of teeth 9. Thus, each inner edge 563 on yoke section 7 of lanced strip 561 comprises arcuate portions 573, 573a which are smoothly formed with flat portion 567 at opposite ends or sides thereof and with opposed edges of adjacent ones of teeth 9 generally at root portions 511 thereof. Each of outer edges 565 include a pair of arcuate edge portions or sections 579, 579a which are generated by a pair of equal radii 581, 581a about centerpoints 577, 577a with radii 581, 581a being predeterminately greater than radii 575, 575a, respectively. Therefore, each outer edge 565 in yoke section 7 of lanced strip 561 includes arcuate portions 579, 579a which are smoothly formed with flat portion 569 at opposite ends or sides thereof, and adjacent ones of the outer edges intersect with each other at 527 while flat portions 569 of the outer edges may be defined by opposite edge 505 on strip stock 3. It may be noted that length 571 of opposite flat portions 567, 569 on inner and outer edges 563, 565, respectively, is predeterminately less than the length of radii 575, 575a; however, while the length of the flat portions on the inner and outer edges is illustrated as being equal, it is contemplated that the length of inner flat portion 567 may be predeterminately less than that of outer flat portion 569 within the scope of the invention so as to meet at least some of the objects thereof. Inner edges 567 on yoke section 7 of lanced strip 561 define therein a closed end of slots 11 generally opposite open ends 515 thereof, and even though the inner edges of the slots include flat portions 567, such slots may be considered to be of the generally "round bottom" construction since, as previously noted, the length 571 of the flat portions are predeterminately less than radii 575, 575a defining arcuate portions 573, 573a, respectively.

A plurality of generally uniform and arcuate segments 583 of yoke section 7 on lanced strip 561 are disposed generally between the sets of inner and outer edges 563, 565 thereof, respectively, and the generally arcuate length 585 of each segment is defined by a pair of imaginary planes 587, 587a extending between centerpoints 577, 577a of radii 575, 575a and 581, 581a and the intersections 577 of adjacent ones of outer edges 565, the imaginary planes extending, of course, generally perpendicular to the plane of the lanced strip, respectively. Segments 583 provided in yoke section 7 of lanced strip 561 in the manner discussed above have a generally uniform cross-sectional area throughout the arcuate lengths 585 of such segments since the cross-sectional areas between flat portions 567, 569 of the segments is believed to be generally close to that between opposite arcuate portions 573, 579 and 573a, 579a of inner and outer edges 563, 565, respectively. Thus, even though inner edges 563 of slots 11 include flat portions 567, the provision of segments 583 with the above discussed generally uniform cross-sectional area over the generally arcuate lengths 585 of the segments in the maximum dimension available with respect to the aforementioned generally "round bottom" constructions of slots 11 and pitch axii 509 of teeth 9. Thus, segments 583 having the above discussed generally uniform cross-sectional area of maximum arcuate length 585 on lanced strip 561 not only accommodates the aforementioned generally "round bottom" construction of slots 11 but also enhances edgewise winding of the lanced strip into a core which requires small unit deformations in yoke section 7 thereof by stressing the segments both in tension and compression over their generally uniform cross-sectional areas along the generally arcuate lengths 585 of the segments, respectively. The edgewise winding of lanced strip 561 into a core, such as discussed hereinabove with respect to cores C and 503, is believed to be generally the same as the previously discussed edgewise winding of lanced strips 5A, 5B, 501. The configuration of lanced strip 561 when edgewise wound into a core is shown in FIG. 31.

From the foregoing, it is now apparent that novel apparatus and methods for forming a core and novel apparatus have been presented meeting at least the objects set out hereinbefore, and it is contemplated that changes as to the precise arrangements, shapes, connections and other details of the constructions illustrated herein for purposes of disclosure, as well as the precise steps and orders thereof of such methods, may be made by those having ordinary skill in the art without departing from the spirit of the invention or from the scope thereof as defined by the claims which follow.

What I claim as new and desire to secure by Letters Patent of the United States is:

1. A method of continuously forming edgewise wound cores from a continuous strip of generally thin ferromagnetic material having a pair of opposite faces interposed between a pair of opposite edges extending at least in part lengthwise of the continuous strip, a bending zone for the continuous strip and having an axis, and a rotatable surface, the method comprising the steps of:

continuously drawing the continuous strip through the bending zone in which at least the opposite edges of the continuous strip are constrained, and continuously bending thereby the continuous strip generally edgewise thereof about the axis of the bending zone so as to continuously form a plurality of generally helical convolutions; and rotating the rotatable surface about the axis of the bending zone and pressing one of the opposite faces of the continuous strip at least as it travels beyond the bending zone against the rotatable surface to effect the continuous drawing of the continuous strip through the bending zone.

2. The method as set forth in claim 1 wherein the bending zone includes a curved bending surface, and a mandrel rotatable about the axis of the bending zone and supporting the rotatable surface, and wherein the continuously drawing and bending step includes constraining the opposite edges of the continuous strip between the curved bending surface and the mandrel.

3. The method a set forth in claim 1 including another rotatable surface conjointly rotatable with the first named rotatable surface and wherein the pressing step includes engaging the another rotatable surface with the other of the opposite faces of the continuous strip at least as it travels beyond the bending zone and assisting thereby at least in part in the continuous drawing of the continuous strip through the bending zone.

4. The method as set forth in claim 3 wherein the engaging and assisting step includes associating the first named and another rotatable surfaces in part in overlaying relation and urging the another rotatable surface toward the first named rotatable surface.

5. The method as set forth in claim 1 further comprising the additional step of accumulating the helical convolutions into a generally axial stack thereof.

6. The method as set forth in claim 5 further comprising the further additional step of severing a respective one of the helical convolutions without interrupting the formation of the helical convolutions at least generally as the accumulated axial stack thereof attains a preselected stack height and forming thereby a respective one of the edgewise wound cores.

7. The method as set forth in claim 6 further comprising the still further additional step removing the respective one edgewise wound core upon the formation thereof and continuing the accumulation of successive ones of the helical convolutions in at least another generally axial stack thereof.

8. A method of forming edgewise wound cores at at least one winding station therefor from a continuous strip of a generally thin ferromagnetic material having a pair of opposite faces interposed between a pair of opposite edges at least in part extending generally lengthwise of the continuous strip, the at least one winding station including a pair of means operable generally for rotation with each other and with one of the rotation means having a surface thereon, and deforming means for association with the one rotation means and having a deformation surface arranged in spaced relation with the first named surface on the one rotation means, the method comprising the steps of:
- engaging the gripping means of the rotation means continuously with the opposite faces of the continuous strip upon the rotation of the rotation means and continuously drawing thereby the continuous strip between the deforming means and the one rotation means;
- confining the opposite edges of the continuous strip in engagement with the deformation surface of the deforming means and the first named surface of the one rotation means during the continuously drawing step and deforming thereby the continuous strip generally edgewise thereof; and
- progressively forming a plurality of generally helical convolutions in the continuous strip as it is edgewise deformed and accumulating the helical convolutions into a generally axial stack thereof.

9. The method as set forth in claim 8 further comprising the additional step of severing a respective one of the helical convolutions at least generally when the axial stack thereof attains a preselected stack height and effecting the formation thereby of a respective one of the edgewise wound cores.

10. The method as set forth in claim 9 further comprising the further additional step of removing the respective one edgewise wound core and continuing the accumulation of successive ones of the helical convolutions into at least another generally axial stack thereof upon the severance of the respective one helical convolution.

11. A method of continuously forming edgewise wound cores at at least one winding station therefor from a continuous strip of a generally thin ferromagnetic material having a pair of opposite faces interposed between a pair of opposite edges extending at least in part lengthwise of the at least one continuous strip, the at least one winding station including a pair of rotatable means adapted for conjoint rotation, and deforming means for association with one of the rotatable means, the method comprising the steps of:
- gripping the opposite faces of the continuous strip between the rotatable means and continuously drawing thereby the continuous strip through at least a part of the at least one winding station upon the conjoint rotation of the rotatable means; and
- confining at least the opposite edges of the continuous strip between the one rotatable means and the deforming means during the gripping and continuously drawing step and progressively deforming thereby the at least one continuous strip generally edgewise thereof into a plurality of generally helical configurations.

12. The method as set forth in claim 11 further comprising the additional step of accumulating the progressively deformed helical convolutions of the continuous strip into a generally axial stack thereof at the at least one winding station.

13. The method as set forth in claim 12 further comprising the further additional step of severing one of the progressively deformed helical convolutions at least generally as the accumulated axial stack of the progressively deformed helical convolutions attains a preselected stack height thereby to define a respective one of the edgewise wound cores.

14. The method as set forth in claim 13 further comprising the still further additional step of removing the one edgewise wound core from the at least one winding station and further accumulating successive ones of the progressively deformed helical convolutions into at least another generally axial stack thereof.

15. The method as set forth in claim 11 wherein the one rotatable means and the deforming means include at least a pair of generally opposed arcuate surfaces and wherein the confining step includes engaging the opposite edges of the continuous strip with the opposed arcuate surfaces of the one rotatable means and the deforming means and effecting thereby the progressive deformation of the continuous strip into the progressively deformed helical convolutions thereof generally about the arcuate surface of the one rotatable means.

16. A method of continuously forming edgewise wound cores from a continuous lanced strip of a generally thin ferromagnetic material having a pair of generally opposite faces interposed between a pair of generally opposite edges at least in part extending generally lengthwise of the lanced strip, a die, and a pair of rotatable mandrels, the method comprising the steps of:
- gripping the opposite faces of the lanced strip at least adjacent one of the opposite edges between generally opposed parts of the rotatable mandrels upon the rotation thereof and drawing the lanced strip continuously and generally edgewise between the die and another part of one of the rotatable mandrels to effect edgewise deformation of the lanced strip in response to the gripping step.

17. The method as set forth in claim 16 wherein the drawing step includes constraining the opposite edges of the lanced strip between the die and the another part of the one rotatable mandrel.

18. The method as set forth in claim 16 wherein the gripping step includes rotating the rotatable mandrels in opposite directions.

19. The method as set forth in claim 16 wherein the gripping step includes urging one of the one rotatable mandrel and the other of the rotatable mandrels into engagement with one of the opposite faces to engage the opposite faces between the opposed parts of the rotatable mandrels.

20. The method as set forth in claim 16 wherein the die includes a curved deformation surface having an axis with the one rotatable mandrel being rotatable about the axis, and wherein the drawing step includes constraining the opposite edges of the lanced strip between the curved deformation surface and the another part of the one rotatable mandrel.

21. The method as set forth in claim 20 wherein the gripping step includes engaging the opposed parts of the rotatable mandrels with the opposite faces of the lanced strip generally as it travels beyond the curved deformation surface.

22. The method as set forth in claim 16 wherein the drawing step includes forming the edgewise deformed lanced strip into a plurality of generally helical convolutions thereof.

23. The method as set forth in claim 22 further comprising the additional step of accumulating the helical convolutions in a generally axial stack thereof.

24. The method as set forth in claim 23 further comprising the further additional step of severing a respective one of the helical convolutions at least generally as the axial stack attains a preselected stack height with the axial stack of the preselected stack height defining a respective one of the edgewise wound cores.

25. The method as set forth in claim 23 further comprising the still further additional step of removing the respective one edgewise wound core without interrupting the formation of the helical convolutions and continuing the accumulation of successive ones of the helical convolutions in at least another generally axial stack thereof.

26. A method of continuously forming edgewise wound cores from a continuous lanced strip of a generally thin ferromagnetic material, the lanced strip including a yoke section defining at least in part an edge of the lanced strip and extending generally lengthwise of the lanced strip, a plurality of teeth with each tooth extending on a preselected pitch axis from the yoke section and having a free tip end defining in part another edge of the lanced strip generally opposite the first named edge thereof, and a pair of generally opposite faces on the lanced strip interposed between the first named and another edges and defining in part the yoke section and the teeth, respectively, a pair of rotatable means adapted for conjoint rotation, and die means for association with one of the rotatable means, the method comprising the steps of:

gripping the opposite faces of the lanced strip at least adjacent the yoke section between the rotatable means and continuously drawing at least the yoke section through the die means upon the conjoint rotation of the rotatable means; and constraining the yoke section at the first named edge and the free tip ends of the teeth respectively between the die means and one of the rotatable means during the continuously drawing step and effecting generally edgewise deformation of the lanced strip into a plurality of generally helical convolutions thereof in response to the constraining step with the teeth in each helical convolution extending on the preselected pitch axes generally radially inwardly from the yoke section.

27. The method as set forth in claim 26 wherein the die means includes a curved deformation surface having an axis with the one rotatable means being rotatable about the axis, and wherein the constraining step includes engaging the yoke section at the first named edge with the curved deformation surface and the free tip ends of the teeth with another surface on the one rotatable means arranged generally in opposed relation with the curved deformation surface during the rotation of the one rotatable means.

28. The method as set forth in claim 26 wherein the rotatable means include a pair of surfaces arranged in part in opposed relation, and wherein the gripping step includes rotating the rotatable means in opposite directions and drivingly engaging the surfaces with the opposite faces of the lanced strip at least adjacent the yoke section at least generally as the lanced strip passes beyond the die means to effect the continuous drawing of at least the yoke section through the die means.

29. The method as set forth in claim 28 wherein the gripping step further includes biasing at least one of the one rotatable means and the other of the rotatable means toward the other of the one and other rotatable means so as to drivingly engage the surfaces with the opposite faces of the lanced strip at least adjacent the yoke section.

30. The method as set forth in claim 26 wherein the gripping step includes rotating the rotatable means in opposite directions.

31. The method as set forth in claim 26 further comprising the additional step of accumulating the helical convolutions into a generally axial stack thereof.

32. The method as set forth in claim 31 further comprising the further additional step of severing a respective one of the helical convolutions at least generally as the axial stack attains a preselected stack height with the axial stack of the preselected stack height defining a respective one of the edgewise wound cores.

33. The method as set forth in claim 32 further comprising the still further additional step of removing the respective one edgewise wound core without interrupting the formation of the helical convolutions and continuing the accumulation of successive ones of the helical convolutions into at least another generally axial stack thereof.

34. Apparatus for continuously forming edgewise wound cores from a continuous strip of ferromagnetic material having a pair of opposite faces interposed between a pair of opposite edges extending at least in part lengthwise of the strip, the device comprising:

a pair of rotatable means arranged in gripping engagement with the opposite faces of the continuous strip and operable generally conjointly for continuously drawing the continuous strip through at least a part of the apparatus; and die means associated with a part of one of said rotatable means so as to constrain at least the opposite edges of the continuous strip therebetween and operable generally conjointly with said one rotatable means part for continuously deforming the continuous strip generally edgewise thereof into a plurality of generally helical convolutions in response to the conjoint operation of said rotatable means.

35. The apparatus as set forth in claim 34 wherein said die means and said one rotatable means part include a pair of opposed arcuate surfaces arranged generally in spaced apart relation and engaged with the opposite edges of the continuous strip to effect the edgewise deformation thereof into the helical convolutions in response to the conjoint operation of said rotatable means.

36. The apparatus as set forth in claim 34 further comprising means associated with one of said die means and said one rotatable means and operable generally for adjusting one of said die means and said one rotatable means part with respect to the other thereof so as to adjustably vary the constraint therebetween of the opposite edges of the continuous strip.

37. The apparatus as set forth in claim 34 wherein said rotatable means include a pair of opposed surfaces arranged in the gripping engagement with the opposite faces of the strip, respectively.

38. The apparatus as set forth in claim 37 further comprising means associated with at least one of said one rotatable means and said other of said rotatable means for adjustably urging at least one of said opposed surfaces toward the other of said opposed surfaces thereby to adjustably vary the intensity of the gripping engagement of said opposed surfaces with the opposite faces of the strip.

39. Apparatus for continuously forming edgewise wound cores from a continuous strip of a generally thin ferromagnetic material having a pair of opposite faces interposed between a pair of opposite edges, the apparatus comprising:
- a pair of means arranged to constrain at least the opposite edges of the continuous strip and operable in response to the passage therebetween of the continuous strip for deforming the continuous strip generally edgewise thereof into a plurality of helical convolutions; and
- a pair of rotatable means associated in gripping engagement with at least a part of the opposite faces on the helical convolutions and operable generally for continuously drawing the continuous strip between said deforming means to effect the deformation thereby of the continuous strip into the helical convolutions thereof, respectively.

40. The apparatus as set forth in claim 39 wherein one of said deforming means comprises a die having a curved surface arranged in constraining engagement with one of the opposite edges.

41. The apparatus as set forth in claim 40 wherein the other of said deforming means comprises an arcuate surface disposed about one of said rotatable means and arranged generally in opposing relation with said curved surface and in constraining engagement with the other of the opposite edges.

42. The apparatus as set forth in claim 104 wherein said one rotatable means is rotatable about the axis of said curved surface.

43. The apparatus as set forth in claim 39 wherein said rotatable means include a pair of opposed surfaces arranged in part in opposed relation and in the gripping engagement with said at least part of the opposite faces on the helical convolutions, respectively.

44. The apparatus as set forth in claim 43 further comprising means associated with at least one of said rotatable means for adjustably urging at least one of said opposed surfaces toward the other of said opposed surfaces thereby to adjustably vary the intensity of the gripping engagement of said opposed surfaces with said at least part of the opposite faces.

45. The apparatus as set forth in claim 39 further comprising means for accumulating the helical convolutions in a generally axial stack thereof.

46. The apparatus as set forth in claim 45 further comprising means for severing a respective one of the helical convolutions at least generally when the axial stack on the accumulating means attains a preselected stack height.

47. The apparatus as set forth in claim 46 further comprising means for removing the accumulating means upon the severance of the respective one helical convolutions without interrupting the passage of the continuous strip between the deforming means.

48. Apparatus for continuously forming edgewise wound cores from a continuous strip of generally thin ferromagnetic material having a pair of opposite faces interposed between a pair of opposite edges at least in part extending generally lengthwise of the continuous strip, the apparatus comprising:
- a die and a rotatable mandrel arranged to constrain at least the opposite edges of the continuous strip and to deform the continuous strip generally edgewise thereof into a plurality of helical convolutions about said rotatable mandrel upon the passage of the continuous strip between said die and said rotatable mandrel; and
- a pair of rotatable discs having a pair of surfaces arranged in part in opposed relation and in gripping engagement with at least a part of the opposite faces on each of the helical convolutions, said surfaces of said rotatable discs being responsive to the continuous rotation of said rotatable discs to draw the strip through at least said die.

49. The apparatus as set forth in claim 48 wherein said die includes at least in part a curved surface having an axis and arranged in constraining engagement with one of the opposite edges.

50. The apparatus as set forth in claim 49 wherein said rotatable mandrel includes a generally arcuate surface arranged generally in opposed relation with said curved surface and in constraining engagement with the other of the opposite edges.

51. The apparatus as set forth in claim 50 wherein said rotatable mandrel is rotatable about the axis of said curved surface.

52. The apparatus as forth in claim 48 further comprising means for adjustably urging at least one of said rotatable discs toward the other of said rotatable discs thereby to adjustably vary the intensity of the gripping engagement of said opposed surfaces with the opposite faces.

53. The apparatus as set forth in claim 48 wherein one of said rotatable disc comprises an integral part of said rotatable mandrel so as to be conjointly rotatable therewith.

54. The apparatus as set forth in claim 48 further comprising means associated with said rotatable mandrel for accumulating the helical convolutions generally in an axial stack thereof.

55. The apparatus as set forth in claim 54 further comprising means for severing a respective one of the helical convolutions at least generally when the axial stack on the accumulating means attains a preselected stack height.

56. The apparatus as set forth in claim 55 further comprising means for disassociating the accumulating means and said rotatable mandrel upon the severance of the respective one helical convolution without interrupting the edgewise deformation of the continuous strip by said die and said rotatable mandrel.

* * * * *